United States Patent
Imai

(10) Patent No.: US 7,034,481 B2
(45) Date of Patent: Apr. 25, 2006

(54) POWER TRANSMISSION DEVICE FOR HYBRID VEHICLE

(75) Inventor: Nobuyuki Imai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/861,496

(22) Filed: Jun. 7, 2004

(65) Prior Publication Data

US 2004/0251862 A1     Dec. 16, 2004

(30) Foreign Application Priority Data

Jun. 12, 2003  (JP) .............................. 2003-168347

(51) Int. Cl.
*H02P 3/14* (2006.01)
*H02P 3/18* (2006.01)

(52) U.S. Cl. .......................... 318/376; 318/9; 318/11; 318/34; 318/51; 318/67; 123/200; 123/319; 180/337; 180/338

(58) Field of Classification Search .............. 318/9–15, 318/376, 34–113
See application file for complete search history.

(56) References Cited

U.S. PATENT DOCUMENTS

| | | | | |
|---|---|---|---|---|
| 6,007,443 A | * | 12/1999 | Onimaru et al. ................ | 475/5 |
| 6,081,042 A | * | 6/2000 | Tabata et al. .................. | 290/45 |
| 6,131,538 A | * | 10/2000 | Kanai ............................ | 123/2 |
| 6,389,807 B1 | * | 5/2002 | Suzuki et al. .................. | 60/285 |
| 6,520,879 B1 | * | 2/2003 | Kawabata et al. ............. | 475/5 |
| 6,563,230 B1 | * | 5/2003 | Nada .......................... | 290/40 C |
| 6,566,826 B1 | * | 5/2003 | Imai et al. .................... | 318/11 |

FOREIGN PATENT DOCUMENTS

JP          11-301291         11/1999

* cited by examiner

*Primary Examiner*—David Martin
*Assistant Examiner*—Erick Glass
(74) *Attorney, Agent, or Firm*—Arent Fox PLLC

(57) ABSTRACT

To provide a power transmission device that can increase the range of speed variation between an engine and a power output shaft and effectively achieve reduction in size and cost of the device arrangement. The speed reduction ratios from an engine 1 to first output shaft 4c, 5c of first and second power distributors 4, 5 are different from each other. A speed change unit 10 is provided between the first output shaft 4c of the first power distributor 4 and a power output shaft 11 linked with driving wheels 2, 2 of the vehicle, and rotation transmission therebetween is achieved at a plurality of stages of speed reduction ratio. The rotation transmission from the first output shaft 5c of the second power distributor 5 to the power output shaft 11 is achieved via gears 20, 15b or rotation transmission mechanisms 15, 14 of a speed change unit 10 at a plurality of stages of speed reduction ratio. The vehicle runs at a variable speed using the power from the engine 1 while motors 6 and 7 apply a driving torque or regenerative torque to a second output shaft 4s of the first power distributor 4 and a second output shaft 5s of the second power distributor 5, respectively.

10 Claims, 7 Drawing Sheets

FIRST SPEED VARIABLE RANGE (R1~R2)

SECOND SPEED VARIABLE RANGE (R2~R3)

THIRD SPEED VARIABLE RANGE (R3~R4)

POWER TRANSMISSION DEVICE FOR HYBRID VEHICLE

BACKGROUND OF THE INVENTION

1. Field of the Invention

The present invention relates to a power transmission device for a hybrid vehicle having an engine, a motor and a power distributor.

2. Description of the Related Art

As a power transmission device for a hybrid vehicle comprising an engine, a motor (electric motor) and a power distributor, there is known a device described in Japanese Patent Laid-Open No. 11-301291 (patent reference 1), for example. The hybrid vehicle comprises an engine, two motors and two power distributors (differential gear units) each comprising a planet gear unit, in which the rotational driving force from the engine is distributed to the input shafts of the power distributors via gears. One of two output shafts of each power distributor is connected to either of the two motors, so that a driving torque (powering torque) or regenerative torque is supplied from the motor to the power distributor. In addition, the other output shafts of the power distributors transmit the rotational driving force to one power output shaft, which is connected to the driving wheels of the vehicle, in parallel. In addition, the speed reduction ratio of the rotation transmission system from the engine to the power output shaft via one power distributor differs from that of the rotation transmission system from the engine to the power output shaft via the other power distributor. Specifically, the speed reduction ratio refers to the speed reduction ratio calculated on the assumption that the rotational speed of the one, connected to the motor, of the two output shafts of the power distributor of the relevant rotation transmission system is 0 (that is, the value obtained by dividing the input rotational speed by the output rotational speed). In the description of prior art, of the speed reduction ratios of the rotation transmission systems, the larger one is referred to as a lower-vehicle-speed speed reduction ratio, and the smaller one is referred to as a higher-vehicle-speed speed reduction ratio.

In the power transmission device for the hybrid vehicle thus configured, if one of the motors is in the driving state (powering state), the other motor is in the regenerative (electric power generating) state, and the power consumed by the driving motor and the power generated by the regenerative motor are kept substantially in equilibrium, the following equation concerning the rotational speed $\omega e$ and torque Te of the engine and the rotational speed $\omega v$ and torque Tv of the power output shaft holds in the steady state (substantially constant speed); $Tv=(\omega e/\omega v) \cdot Te$. Here, the speed reduction ratio ($\omega e/\omega v$) from the engine to the power output shaft can be arbitrarily changed between the lower-vehicle-speed speed reduction ratio and the higher-vehicle-speed speed reduction ratio by controlling the torque of the motors.

Thus, when the vehicle runs using the engine as the propulsive source, the torques of the motors can be controlled to vary continuously the speed reduction ratio (speed change ratio) from the engine to the power output shaft, thereby achieving the same performance as a device having an infinite variable speed drive, such as a CVT, provided between the engine and the power output shaft. That is, without any infinite variable speed drive such as CVT, the vehicle can run using the power from the engine while conducting speed variation between the engine and the power output shaft.

In the power transmission device for a hybrid vehicle of this type, some of the energy of the engine is output to the power output side via the regenerative motor and the driving motor in this order. From studies by the inventors, it is shown that, in this case, as the ratio between the lower-vehicle-speed speed reduction ratio and the higher-vehicle-speed speed reduction ratio (lower-vehicle-speed speed reduction ratio/higher-vehicle-speed speed reduction ratio) increases, the part of the output energy of the engine which is distributed to the motors increases, so that the efficiency of energy transmission from the engine to the power output shaft is reduced. In addition, since the energy distributed to the motors increases, the capacities of the motors also increase. Therefore, it is difficult to significantly increase the ratio between the lower-vehicle-speed speed reduction ratio and the higher-vehicle-speed speed reduction ratio in the power transmission device for a hybrid vehicle described in the patent reference 1. As a result, compared with typical cars, the hybrid vehicle often runs at the lower-vehicle-speed speed reduction ratio, and gears or other components of the power transmission device operate at high speeds. In addition, the engine often operates in high-speed revolution regions. Thus, the components of the power transmission device have to be increased in durability, and there is a difficulty in reducing the fuel consumption of the engine.

To eliminate such disadvantages, a speed change unit that changes the lower-vehicle-speed speed reduction ratio or higher-vehicle-speed speed reduction ratio in a plurality of stages may be provided between each power distributor and the power output shaft. However, simply providing such a speed change unit results in increase in size and cost of the power transmission device, which are desired to be reduced to a minimum.

The present invention has been devised in view of such circumstances, and an object of the present invention is to provide a power transmission device that can increase the range of speed variation between an engine and a power output shaft and effectively achieve reduction in size and cost of the device arrangement.

SUMMARY OF THE INVENTION

To achieve the object described above, a power transmission device for a hybrid vehicle according to a first implementation of the present invention is an improvement of a power transmission device for a hybrid vehicle comprising: a first and a second power distributor each of which receives, at an input shaft, a rotational driving force from an engine; a power output shaft that receives the rotational driving force from a first output shaft of two output shafts of the first power distributor and a first output shaft of two output shafts of the second power distributor and outputs the received rotational driving force to driving wheels of the vehicle; a first motor that supplies a driving torque or regenerative torque to a second output shaft of the first power distributor; and a second motor that supplies a driving torque or regenerative torque to a second output shaft of the second power distributor, a rotation transmission system from the engine to the power output shaft via the first power distributor and a rotation transmission system from the engine to the power output shaft via the second power distributor being configured with different speed reduction ratio values. The first implementation is characterized in that a rotation transmission system from the engine to the first output shaft of the first power distributor via the input shaft thereof and a rotation transmission system from the engine to the first output shaft of the second power distributor via the input shaft thereof are configured with different speed reduction ratio values, a first speed change unit for switching the speed reduction ratio from the first output shaft of the first power distributor to the power output shaft at a plurality of stages is provided with at least a rotation transmission system on the side of a first power distributor of the rotation transmission system from the first output shaft of the first power distributor to the power output shaft and a rotation transmission system from the first output shaft of the second power distributor to the power output shaft, has, and the rotation transmission system from the first output shaft of the second power distributor to the power output shaft achieves rotation transmission from the first output shaft of the second power distributor to the power output shaft via a rotational member of at least one of rotation transmission mechanisms for the stages of the first speed change unit, the rotational member being arranged concentrically with the power output shaft.

According to the first implementation, of the rotation transmission system from the first output shaft of the first power distributor to the power output shaft (referred to as an output-side first partial rotation transmission system hereinafter) and the rotation transmission system from the first output shaft of the second power distributor to the power output shaft (referred to as an output-side second partial rotation transmission system hereinafter), at least the output-side first partial rotation system has the first speed change unit that switches the speed reduction ratio among a plurality of stages. Therefore, the speed reduction ratio of at least the rotation transmission system from the engine to the power output shaft via the first power distributor (including the output-side first partial rotation transmission system) can be switched among a plurality of speed reduction ratios. As a result, a plurality of sets of speed reduction ratios of the rotation transmission system from the engine to the power output shaft via the first power distributor (referred to as a first rotation transmission system hereinafter) and the rotation transmission system from the engine to the power output shaft via the second power distributor (referred to as a second rotation transmission system hereinafter) can be provided.

The speed reduction ratio of the first rotation transmission system is the product of the speed reduction ratio of the rotation transmission system from the engine to the first output shaft of the first power distributor via the input shaft thereof (referred to as an input-side first partial rotation transmission system) and the speed reduction ratio of the output-side first partial rotation transmission system. Similarly, the speed reduction ratio of the second rotation transmission system is the product of the speed reduction ratio of the rotation transmission system from the engine to the first output shaft of the second power distributor via the input shaft thereof (referred to as an input-side second partial rotation transmission system) and the speed reduction ratio of the output-side second partial rotation transmission system. In the first implementation, the speed reduction ratio of the input-side first partial rotation transmission system differs from the speed reduction ratio of the input-side second partial rotation transmission system. Therefore, the speed reduction ratio of the output-side rotation transmission system doesn't need to be a dedicated value therefor to make the speed reduction ratio of the first rotation transmission system differ from that of the second rotation transmission system, and the speed reduction ratio of the output-side rotation transmission system may be the same as the speed reduction ratio of the output-side first partial rotation transmission system for any of the stages of the first speed change unit. Thus, in the first implementation, the output-side second partial rotation transmission system achieves rotation transmission from the first output shaft of the second power distributor to the power output shaft via the rotational member of at least one of rotation transmission mechanisms for the stages of the first speed change unit, the rotational member being arranged concentrically with the power output shaft. As a result, some components of the output-side second partial rotation transmission system and the first speed change unit are shared, so that the arrangement comprising the output-side first partial rotation transmission system including the first speed change unit and the output-side second partial rotation transmission system can be smaller in size. Here, the speed reduction ratios of the input-side first partial rotation transmission system and the input-side second partial rotation transmission system can be constant, so that they can be made smaller by using gears or the like.

Thus, with the power transmission device according to the first implementation, the variation range of the speed reduction ratio between the engine and the power output shaft can be increased, and the size and manufacturing cost of the device can be effectively reduced.

Incidentally, for example, it is assumed that the first rotation transmission system has two speed reduction ratios which can be switched by the first speed change unit (that is, the first speed change unit can switch the speed in two stages), and the speed reduction ratios are denoted by R1 and R3 (R1>R3). Furthermore, for example, it is assumed that the second rotation transmission system has one speed reduction ratio, which is denoted by R2. Then, in the first implementation, it is desirable that the speed reduction ratio of the input-side first partial rotation transmission system, the speed reduction ratio of the input-side second partial rotation transmission system, the speed reduction ratio of the output-side first partial rotation transmission system including the first speed change unit, and the speed reduction ratio of the output-side second partial rotation transmission system are determined so that the speed reduction ratio R2 of the second rotation transmission system lies between the two speed reduction ratios R1 an R3 of the first rotation transmission system (that is, R1>R2>R3). In such a case, if the speed reduction ratio of the first rotation transmission system is R1, the speed reduction ratio between the engine and the power output shaft can be varied within a speed variable range from R1 to R2, and if the speed reduction ratio of the first rotation transmission system is R3, the speed reduction ratio between the engine and the power output shaft can be varied within a speed variable range from R2 to R3. Thus, the speed reduction ratio between the engine and the power output shaft can be continuously varied between R1 and R3.

In the first implementation, it is preferable that the rotation transmission system from the first output shaft of the second power distributor to the power output shaft comprises second-power-distributor-side rotation transmission means concentric with the power output shaft for achieving rotation transmission from the first output shaft of the second power distributor to the power output shaft via a rotational member of a rotation transmission mechanism for a predetermined stage of the rotation transmission mechanisms for the stages of the first speed change unit at a speed reduction ratio equal to that of the rotation transmission mechanism for the predetermined stage (second implementation).

According to this implementation, the rotation transmission system for the predetermined stage of the first speed change unit and the output-side second partial rotation transmission mechanism can share a component (gear or the like). At the same time, the first output shafts of the power distributors can be at an equal distance from the power output shaft, so that the power transmission device can be smaller in size.

Furthermore, in the second implementation, it is preferable that the power transmission device further comprises: clutch means for connecting and disconnecting the rotational member concentric with the power output shaft of the rotation transmission mechanism for the predetermined stage of the first speed change unit to and from the power output shaft; and clutch means for connecting and disconnecting a rotational member concentric with the first output shaft of the first power distributor of the rotation transmission mechanism for the predetermined stage to and from the first output shaft (third implementation).

According to this implementation, depending on the combination of the states (connecting and separating states) of the clutches, the output-side second partial rotation transmission system can achieve not only rotation transmission to the power output shaft via the rotational member, concentric with the power output shaft, of the rotation transmission mechanism for the predetermined stage of the first speed change unit but also rotation transmission to the power output shaft via the rotation transmission mechanism for another stage of the first speed change unit. As a result, the speed reduction ratio of the output-side second partial rotation transmission system can be switched among a plurality of speed reduction ratios which are the same as those of the first speed change unit. Accordingly, the range of speed variation from the engine to the power output shaft can be further increased.

For example, in the case where the first speed change unit can change the speed in two stages, the speed reduction ratio of the output-side second partial rotation transmission system and, therefore, the speed reduction ratio of the second rotation transmission system can be switched between two speed reduction ratios which are the same as those of the output-side first partial rotation transmission system while sharing the rotation transmission mechanism of the first speed change unit. In this case, given that the first rotation transmission system has speed reduction ratios R1 and R3 (R1>R3), and the second rotation transmission system has speed reduction ratios R2 and R4 (R2>R4), the speed reduction ratio of the input-side first partial rotation transmission system, the speed reduction ratio of the input-side second partial rotation transmission system, and the speed reduction ratio of the output-side first partial rotation transmission system including the first speed change unit are determined so that R1>R2>R3>R4. In such a case, if the speed reduction ratio of the first rotation transmission system is R1 and the speed reduction ratio of the second rotation transmission system is R2, the speed reduction ratio between the engine and the power output shaft can be varied within a speed variable range from R1 to R2, if the speed reduction ratio of the first rotation transmission system is R3 and the speed reduction ratio of the second rotation transmission system is R2, the speed reduction ratio between the engine and the power output shaft can be varied within a speed variable range from R2 to R3, and if the speed reduction ratio of the first rotation transmission system is R3 and the speed reduction ratio of the second rotation transmission system is R4, the speed reduction ratio between the engine and the power output shaft can be varied within a speed variable range from R3 to R4. Thus, the speed reduction ratio between the engine and the power output shaft can be continuously varied between R1 and R4.

In the second or third implementation, it is preferable that the ratios between the speed reduction ratios of the rotation transmission mechanisms for the stages of the first speed change unit are values substantially equal to powers of $\alpha$, where $\alpha$ is the ratio between the speed reduction ratio of the rotation transmission system from the engine to the first output shaft of the first power distributor via the input shaft thereof and the speed reduction ratio of the rotation transmission system from the engine to the first output shaft of the second power distributor via the input shaft thereof (fourth implementation).

According to this implementation, the vehicle can run at a variable speed in a plurality of speed variable ranges for which the ratios between the minimum value and the maximum value of the speed reduction ratio from the engine to the power output shaft are substantially equal to each other. For example, given that the first rotation transmission system has speed reduction ratios R1 and R3 (R1>R3), and the second rotation transmission system has speed reduction ratios R2 and R4 (R2>R4), the ratio (R1/R2) between the minimum and the maximum for the speed variable range from R1 to R2, the ratio (R2/R3) between the minimum and the maximum for the speed variable range from R2 to R3, and the ratio (R3/R4) between the minimum and the maximum for the speed variable range from R3 to R4 can be equal to each other (that is, R1/R2=R2/R3=R3/R4). Then, the maximum torques which the motors are required to generate can be substantially equal for the speed variable ranges, so that the required capacity of the motors can be reduced, and the motors can be smaller in size.

In the first implementation, the rotation transmission system from the first output shaft of the second power distributor to the power output shaft comprises a second speed change unit for switching the speed reduction ratio from the first output shaft of the second power distributor to the power output shaft at a plurality of stages. In this case, it is preferable that at least one of the rotation transmission mechanisms for the stages of the second speed change unit is configured to achieve rotation transmission from the first output shaft of the second power distributor to the power output shaft via a rotational member of a rotation transmission mechanism concentric with the power output shaft for a predetermined stage of the rotation transmission mechanisms for the stages of the first speed change unit at a speed reduction ratio equal to that of the rotation transmission mechanism for the predetermined stage (fifth implementation).

According to this implementation, it is possible not only to switch the speed reduction ratio of the output-side first partial rotation transmission system among a plurality of values by the first speed change unit but also to switch the speed reduction ratio of the output-side second partial rotation transmission system among a plurality of values by the second speed change unit. Thus, the range of speed variation from the engine to the power output shaft can be further increased. At the same time, the first speed change unit of the output-side first partial rotation transmission system and the second speed change unit of the output-side second partial rotation transmission mechanism can share a component (gear or the like), and the first output shafts of the power distributors can be at an equal distance from the power output shaft. Thus, the power transmission device can be smaller in size.

In the fifth implementation, it is preferable that the first speed change unit and the second speed change unit have an equal number of stages of speed reduction ratio, the sets of values of the speed reduction ratios of the plurality of stages of the first speed change unit are the same as the sets of values of the speed reduction ratios of ae plurality of the stages of the second speed change unit, the rotation transmission mechanism for each stage of the first speed change unit and the rotation transmission mechanism of the second speed change unit for the stage of the same speed reduction ratio as the rotation transmission mechanism of the first speed change unit are arranged to achieve rotation transmission from the first output shaft of each power distributor to the power output shaft via the shared rotational member concentric with the power output shaft (sixth implementation).

According to this implementation, the first speed change unit of the output-side first partial rotation transmission system and the second speed change unit of the output-side second partial rotation transmission system can have the same configuration, and the rotation transmission mechanisms of the speed change units for the same stage of speed reduction ratio can share the rotational member concentric with the power output shaft. As a result, both the first and second speed change units can be smaller in size, so that the power transmission device can be smaller in size.

Incidentally, in the sixth implementation, given that the first rotation transmission system has two speed reduction ratios R1 and R3 (R1>R3 ) which can be switched by the first speed change unit, and the second rotation transmission system has two speed reduction ratios R2 and R4 (R2>R4 ) which can be switched by the second speed change unit, it is desirable that the speed reduction ratio of the input-side first partial rotation transmission system, the speed reduction ratio of the input-side second partial rotation transmission system, and the speed reduction ratios of the first and second speed change units are determined so that R1>R2>R3>R4 , as in the third implementation.

Furthermore, in the fifth or sixth implementation, it is preferable that the ratios between the speed reduction ratios of the rotation transmission mechanisms for the stages of each of the first and second speed change units are values substantially equal to powers of α, where α is the ratio between the speed reduction ratio of the rotation transmission system from the engine to the first output shaft of the first power distributor via the input shaft thereof and the speed reduction ratio of the rotation transmission system from the engine to the first output shaft of the second power distributor via the input shaft thereof (seventh implementation).

According to this implementation, as in the fourth implementation, the vehicle can run at a variable speed in a plurality of speed variable ranges for which the ratios between the minimum value and the maximum value of the speed reduction ratio from the engine to the power output shaft are substantially equal to each other. Thus, the required capacity of the motors can be reduced, and the motors can be smaller in size.

In the first to seventh implementations, it is preferable that the first and second power distributors are each constituted by a planet gear unit comprising a ring gear, a carrier and a sun gear serving as the input shaft, the first output shaft and the second output shaft, respectively, the planet gear unit constituting any one of the power distributors comprises a plurality of pinion gears shaft-supported by the carrier each of which meshes with the ring gear and the sun gear, and the planet gear unit constituting the other of the power distributors comprises a plurality of pairs of pinion gears shaft-supported by the carrier, the pinion gears in each pair meshing with each other and with the ring gear and the sun gear (eighth implementation). The planet gear unit constituting said one power distributor is a single-pinion-type one, and the planet gear unit constituting the other power distributor is a double-pinion-type one.

According to this implementation, even if the ring gears and sun gears of the power distributors have substantially the same diameters, the speed reduction ratios of the power distributors from the respective input shafts to the respective first output shafts differ from each other. Therefore, it is possible to provide, with a small arrangement, different speed reduction ratios of the input-side first partial rotation transmission system and input-side second partial rotation transmission system while reducing imbalance between the input-side first partial rotation transmission system and the input-side second partial rotation transmission system.

Furthermore, in the first to eighth implementations, it is preferable that the rotation transmission system from the engine to the first motor via the input shaft and second output shaft of the first power distributor and the rotation transmission system from the engine to the second motor via the input shaft and second output shaft of the second power distributor are configured to have substantially the same speed reduction ratio (ninth implementation).

According to this implementation, the maximum torques which the first and second motors have to generate when the vehicle runs at a variable speed can be equal to each other, and thus, the required capacities of the motors can be equal to each other. In particular, if the ninth implementation is combined with the third or seventh implementation, the required capacities of the motors can be equal to each other and reduced, so that downsizing of the motors can be effectively achieved.

Furthermore, in the first to ninth implementations, it is preferable that the rotation shaft of the first motor is arranged concentrically with the second output shaft of the first power distributor, the rotation shaft of the second motor is arranged concentrically with the second output shaft of the second power distributor, the power transmission device comprises a power input shaft for distributing the rotational driving force from the engine to the input shafts of the power distributors, and the first and second motors are positioned in such a manner that the shaft centers of the rotation shafts thereof are symmetric with respect to the shaft center of the power input shaft (tenth implementation).

According to this implementation, the motors can be disposed as close as possible while assuring that the shaft centers of the motors are at an equal distance from the power input shaft, and thus, the power transmission device can be smaller in size.

DETAILED DESCRIPTION OF THE PREFERRED EMBODIMENTS

Figure 1:
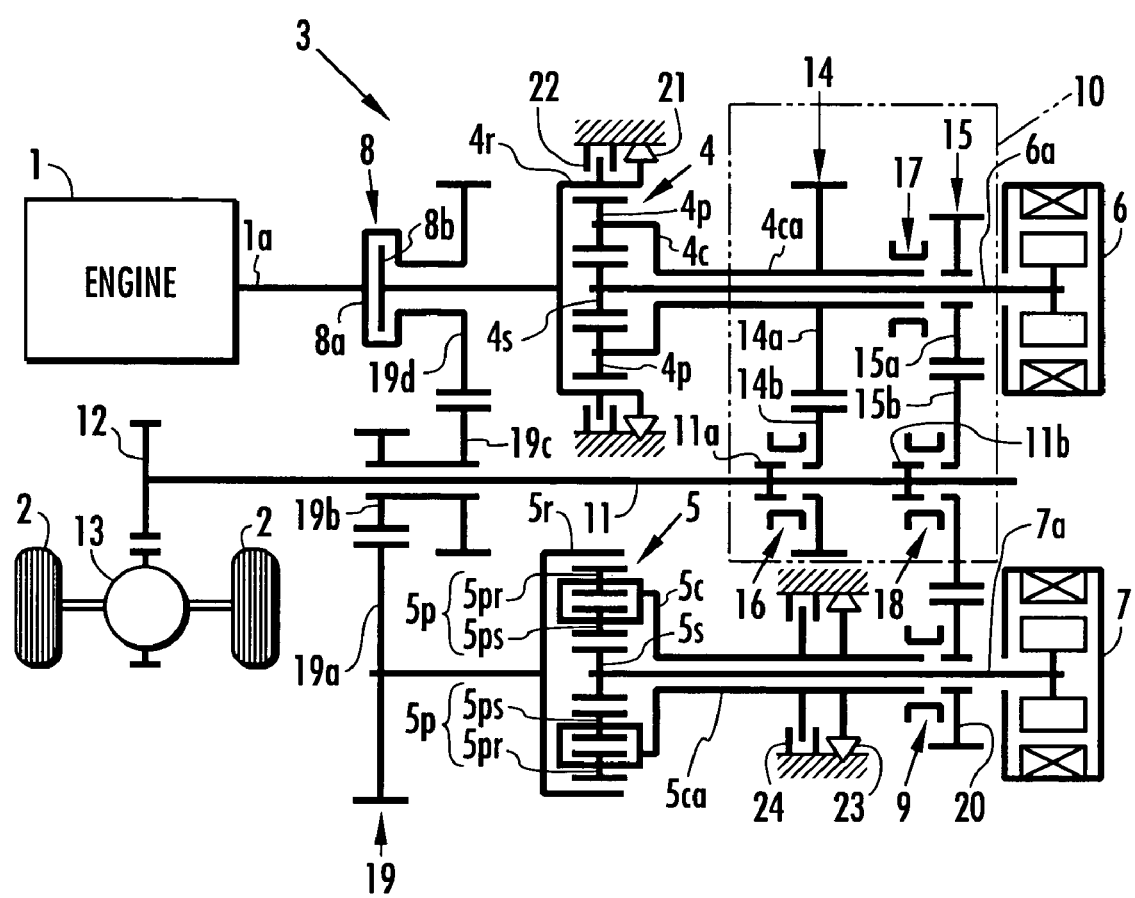
FIG. 1 is a schematic system diagram showing a whole arrangement of a hybrid vehicle provided with a power transmission device according to a first embodiment of the present invention.

A power transmission device for a hybrid vehicle according to a first embodiment of the present invention will be described in detail with reference to FIGS. 1 to 5. FIG. 1 is a schematic system diagram showing a whole arrangement of the hybrid vehicle with the power transmission device according to this embodiment. Reference numeral 1 denotes an engine, reference numerals 2, 2 each denote a driving wheel, and reference numeral 3 denotes a power transmission device.

As essential mechanical elements, the power transmission device 3 comprises a first power distributor 4, a second power distributor 5, a first motor 6, a second motor 7, clutches 8 and 9, a speed change unit 10 and a power output shaft 11. The power output shaft 11 is linked with the driving wheels 2, 2 via a gear 12 capable of rotating integrally with the shaft and a differential gear unit 13 (differential bevel gear unit) engaging with the gear 12, so that the power output shaft can rotate in association with the driving wheels 2, 2.

The power distributors 4 and 5 each comprise a planet gear unit serving as a differential gear unit. In this embodiment, the planetary gear unit constituting the first power distributor 4 is of a single-pinion type, in which a plurality of (two in the drawing) planetary gears 4p, which are spaced apart from each other along the circumference of a sun gear 4s, are arranged between a ring gear 4r and the sun gear 4s, and each planetary gear 4p engages with both the ring gear 4r and the sun gear 4s. The planetary gears 4p are shaft-supported by a carrier 4c so that they revolve integrally around the sun gear 4s while each rotating. On the other hand, the planet gear unit constituting the second power distributor 5 is of a double-pinion type, in which a plurality of pairs (two pairs in the drawing) of planetary gears 5pr and 5ps engaging with each other (refereed to as a planetary gear pair 5p, hereinafter) are arranged between a ring gear 5r and a sun gear 5s. The plurality of planetary gear pairs 5p are arranged along the circumference of the sun gear 5s with being spaced apart from each other, and the planetary gears 5pr and 5ps constituting each planetary gear pair 5p engage with the ring gear 5r and the sun gear 5s. The plurality of planetary gear pairs 5p are shaft-supported by a carrier 5c so that they revolve integrally around the sun gear 5s while each planetary gear 5pr, 5ps rotating.

Since the structures of the planet gear units of the single-pinion type and double-pinion type have been well known, further description thereof will be omitted.

An output shaft 1a of the engine 1 is connected to an input port 8a of the clutch 8 of a friction-plate type, for example, and can rotate integrally with the input port 8a. The ring gear 4r as an input shaft of the first power distributor 4 is connected to an output port 8b of the clutch 8 and can rotate integrally with the output port 8b. Thus, when the clutch 8 is in an engagement state (where the input port 8a and the output port 8b are linked with each other), any rotation can be transmitted between the output shaft 1a of the engine 1 and the ring gear 4r of the first power distributor 4. On the other hand, when the clutch 8 is in a disengagement state (where the input port 8a and the output port 8b are separated from each other), any rotation cannot be transmitted between the output shaft 1a of the engine 1 and the ring gear 4r of the first power distributor 4.

Of the carrier 4c and the sun gear 4s serving as two output shafts of the first power distributor 4, the sun gear 4s, which serves as a second output shaft, is concentrically connected to a rotation shaft 6a of the first motor 6, so that it can rotate integrally with the rotation shaft 6a. In this embodiment, the rotation shaft 6a of the first motor 6 (or a rotation shaft that connects the shaft 6a to the sun gear 4s) is connected to the sun gear 4s, passing through the interior of a shaft portion 4ca of the carrier 4c. The shaft portion 4ca of the carrier 4c, which serves as a first output shaft of the first power distributor 4, is connected to the power output shaft 11 via the speed change unit 10 (which corresponds to a first speed change unit according to the present invention) disposed between the first power distributor 4 and the first motor 6.

The speed change unit 10 can change the speed reduction ratio of rotation transmission from the carrier 4c to the power output shaft 11 in a plurality of (two, in this embodiment) stages and has rotation transmission mechanisms 14 and 15 responsible for rotation transmission at the respective speed reduction ratios. The speed reduction ratio of the rotation transmission mechanism 14 should be lower than that of the rotation transmission mechanism 15. Thus, in the following description, the rotation transmission mechanisms 14 and 15 will be referred to as a lower-speed-reduction-ratio rotation transmission mechanism 14 and a higher-speed-reduction-ratio rotation transmission mechanism 15, respectively. The speed change unit 10 functions as an output-side first partial rotation transmission system.

Of the rotation transmission mechanisms 14 and 15, the lower-speed-reduction-ratio rotation transmission mechanism 14 comprises a gear 14a provided concentrically with the carrier 4c and a gear 14b meshing with the gear 14a and provided concentrically with the power output shaft 11. The gear 14a is fixed to the shaft portion 4ca of the carrier 4c and can rotate integrally therewith, and the gear 14b is borne by the power output shaft 11 so that it can relatively rotate with respect to the power output shaft 11. Furthermore, there is also provided a clutch 16 that engages and disengages the rotation transmission between the gear 14b and the power output shaft 11. In the engagement state (where the rotation transmission is engaged), the clutch 16 connects, via spline fitting or the like, a member 11a fixed to the power output shaft 11 to the gear 14b so that they can rotate integrally.

On the other hand, the higher-speed-reduction-ratio rotation transmission mechanism 15 comprises a gear 15a provided concentrically with the carrier 4c and a gear 15b meshing with the gear 15a and provided concentrically with the power output shaft 11. The gear 15a is borne by the rotation shaft 6a of the first motor 6 between the shaft portion 4ca of the carrier 4c and the first motor 6 so that it can relatively rotate with respect to the carrier 4c and the rotation shaft 6a of the first motor 6. The gear 15b is borne by the power output shaft 11 so that it can relatively rotate with respect to the power output shaft 11. Furthermore, there are also provided a clutch 17 that engages and disengages the rotation transmission between the gear 15a and the shaft portion 4ca of the carrier 4c, and a clutch 18 that engages and disengages the rotation transmission between the gear 15b and the power output shaft 11. In the engagement state, the clutch 17 connects, via spline fitting or the like, the shaft portion 4ca of the carrier 4c to the gear 15a so that they can rotate integrally. Similarly, in the engagement state, the clutch 18 connects, via spline fitting or the like, a member 11b fixed to the power output shaft 11 to the gear 15b so that they can rotate integrally.

As described above, in the speed change unit 10 with the clutches 16, 17 and 18, when the clutch 16 is in the disengagement state and the clutches 17 and 18 are in the engagement state, the rotation transmission from the carrier 4c to the power output shaft 11 is achieved by the higher-speed-reduction-ratio rotation transmission mechanism 15, and the speed reduction ratio of the rotation transmission is that of the higher-speed-reduction-ratio rotation transmission mechanism 15. Or, when the clutch 16 is in the engagement state and the clutch 18 is in the disengagement state (the clutch 17 may be in any state), the rotation transmission from the carrier 4c to the power output shaft 11 is achieved by the lower-speed-reduction-ratio rotation transmission mechanism 14, and the speed reduction ratio of the rotation transmission is that of the lower-speed-reduction-ratio rotation transmission mechanism 14.

The clutches 16, 17 and 18 may be dog clutches or ones using friction force. The lower-speed-reduction-ratio rotation transmission mechanism 14 and the higher-speed-reduction-ratio rotation transmission mechanism 15 may be ones that achieve rotation transmission using a sprocket and a chain, for example. In addition, the gears 14a, 14b, 15a and 15b of the speed change unit 10 correspond to rotational members according to the present invention, and the clutches 17 and 18 correspond to clutch means according to the present invention.

The ring gear 5r serving as an input shaft of the second power distributor 5 is connected to the output shaft 1a of the engine 1 via a rotation transmission mechanism 19, which comprises a gear 19a capable of rotating integrally with the ring gear 5r, an idle gear 19b capable of rotating by meshing with the gear 19a, and an idle gear 19c capable of rotating integrally with the idle gear 19b, and a gear 19d meshing with the idle gear 19c and capable of rotating integrally with the input port 8a of the clutch 8. In this embodiment, the idle gears 19b and 19c are concentrically borne by the power output shaft 11 so that they can relatively rotate with respect to the power output shaft 11.

Of the carrier 5c and the sun gear 5s serving as two output shafts of the second power distributor 5, the sun gear 5s, which serves as a second output shaft, is concentrically connected to a rotation shaft 7a of the second motor 7, so that it can rotate integrally with the rotation shaft 7a. In this embodiment, the rotation shaft 7a of the second motor 7 (or a rotation shaft that connects the shaft 7a to the sun gear 5s) is connected to the sun gear 5s, passing through the interior of a shaft portion 5ca of the carrier 5c.

Between the shaft portion 5ca of the carrier 5c, which serves as a first output shaft of the second power distributor 5, and the second motor 7, a gear 20 which engages with the gear 15b of the higher-speed-reduction-ratio rotation transmission mechanism 15 of the speed change unit 10 is provided concentrically with the carrier 5c. The gear 20 is to achieve rotation transmission among the gear 15b, the carrier 5c of the second power distributor 5 and the power output shaft 11 and is borne by the rotation shaft 7a of the second motor 7 so that it can relatively rotate with respect to the carrier 5c and the rotation shaft 7a of the second motor 7. The clutch 9 described above is provided to engage and disengage the rotation transmission between the gear 20 and the shaft portion 5ca of the carrier 5c. As with the clutches 16 to 18 of the speed change unit 10, in the engagement state, the clutch 9 connects, via spline fitting or the like, the shaft portion 5ca of the carrier 5c to the gear 20 so that they can rotate integrally. As with the clutches 16 to 18, the clutch 9 may be a dog clutch or one using friction force. The gear 20, together with the gear 15b, constitutes a second-power-distributor-side rotation transmission means according to the present invention.

In this embodiment, the distance between the center of the power output shaft 11 and the shaft center of the carrier 4c of the first power distributor 4 (which corresponds with the shaft center of the first motor 6) is equal to the distance between the center of the power output shaft 11 and the shaft center of the carrier 5c of the second power distributor 5 (which corresponds with the shaft center of the second motor 7), and the diameter and number of teeth of the gear 20 are equal to those of the gear 15a of the higher-speed-reduction-ratio rotation transmission mechanism 15 of the speed change unit 10. Thus, when the clutch 9 is in the engagement state, if the clutch 18 is in the engagement state (the clutches 16 and 17 may be in any state), the rotation transmission from the carrier 5c to the power output shaft 11 is achieved via the gear 20 and the gear 15b of the higher-speed-reduction-ratio rotation transmission mechanism 15, and, thus, the speed reduction ratio of the rotation transmission is equal to the speed reduction ratio of the higher-speed-reduction-ratio rotation transmission mechanism 15. On the other hand, if the clutch 18 is in the disengagement state while the clutches 16 and 17 are in the engagement state, the rotation transmission from the carrier 5c to the power output shaft 11 is achieved via the gear 20, the higher-speed-reduction-ratio rotation transmission mechanism 15, the clutch 17, the lower-speed-reduction-ratio rotation transmission mechanism 14 and the clutch 16, and, thus, the speed reduction ratio of the rotation transmission is equal to the speed reduction ratio of the lower-speed-reduction-ratio rotation transmission mechanism 14. In this way, by using the lower-speed-reduction-ratio rotation transmission mechanism 14 and higher-speed-reduction-ratio rotation transmission mechanism 15 of the speed change unit 10, the speed reduction ratio of the rotation transmission from the carrier 5c of the second power distributor 5 to the power output shaft 11 (the speed reduction ratio of an output-side second partial rotation transmission system) can be changed in two stages, as with the speed reduction ratio of the rotation transmission from the carrier 4c of the first power distributor 4 to the power output shaft 11.

In FIG. 1, reference numeral 21 denotes a one-way clutch that prevents the ring gear 4r of the first power distributor 4 from rotating in one predetermined direction, reference numeral 22 denotes a lock mechanism that prevents the ring gear 4r from rotating in the direction permitted by the one-way clutch 21 as required, reference numeral 23 denotes a one-way clutch that prevents the carrier 5c of the second power distributor 5 from rotating in one predetermined direction, and reference numeral 24 denotes a lock mechanism that prevents the carrier 5c from rotating in the direction permitted by the one-way clutch 23 as required. The one-way clutches 21 and 23 and the lock mechanisms 22 and 24 are used to make the vehicle run using only the driving torque of the first motor 6 without using any power from the engine 1, or to prevent the rotation of the ring gear 4r or carrier 5c in order to start the engine 1 with the second motor 7, for example. In variable-speed running of the vehicle, which concerns the essence of the present invention, the one-way clutches 21 and 23 and the lock mechanisms 22 and 24 does not prevent the rotation of the ring gear 4r and carrier 5c (that is, the ring gear 4r and the carrier 5c are free to rotate).

Now, the speed reduction ratio of the rotation transmission system of the power transmission device 3 will be described. As shown in Table 1 given below, the speed reduction ratio of the rotation transmission system from the output shaft 1a of the engine 1 to the ring gear 4r of the first power distributor 4 at the time when the clutch 8 is in the engagement state is k1, and the speed reduction ratio of the rotation transmission system from the output shaft 1a of the engine 1 to the ring gear 5r of the second power distributor 5 (that is, the speed reduction ratio of the rotation transmission from the gear 19d to the gear 19a of the rotation transmission mechanism 19) is k2. In addition, the speed reduction ratio from the ring gear 4r to the sun gear 4s of the first power distributor 4 (that is, the gear ratio (ratio of number of teeth) of the sun gear 4s to the ring gear 4r) is km, and the speed reduction ratio from the ring gear 5r to the sun gear 5s of the second power distributor 5 (that is, the gear ratio (ratio of number of teeth) of the sun gear 5s to the ring gear 5r) is kp. Furthermore, the speed reduction ratio of the lower-speed-reduction-ratio rotation transmission mechanism 14 of the speed change unit 10 is k3, and the speed reduction ratio of the higher-speed-reduction-ratio rotation transmission mechanism 15 of the speed change unit 10 is k4 (>k3). Since the speed reduction ratio of each of the rotation transmission mechanisms 14 and 15 of the speed change unit 10 is the speed reduction ratio of the rotation transmission from the carrier 4c of the first power distributor 4 to the power output shaft 11, in this embodiment, the speed reduction ratio of the lower-speed-reduction-ratio rotation transmission mechanism 14 represents the gear ratio (ratio of number of teeth) of the gear 14b to the gear 14a, and the speed reduction ratio of the higher-speed-reduction-ratio rotation transmission mechanism 15 represents the gear ratio (ratio of number of teeth) of the gear 15b to the gear 15a.

TABLE 1

| Rotation transmission system | Speed reduction ratio | (Example) |
|---|---|---|
| From engine to ring gear of first power distributor | k1 | 1 |
| From engine to ring gear of second power distributor | k2 | 1.4 |
| From ring gear to sun gear of first power distributor | km | 0.6 |
| From ring gear to sun gear of second power distributor | kp | 0.43 |
| Lower-speed-reduction-ratio rotation transmission mechanism of speed change unit | k3 | 0.5 |
| Higher-speed-reduction-ratio rotation transmission mechanism of speed change unit | k4 (= $\alpha^2 \cdot$ k3) | 2 |
| From engine to carrier of first power distributor | k1 · (1 + km) (= $\alpha \cdot$ k2 · (1 − kp)) | 1.6 |
| From engine to carrier of second power distributor | k2 · (1 − kp) | 0.8 |
| From engine to first motor | k1 · km | 0.6 |
| From engine to second motor | k2 · kp (= k1 · km) | 0.6 |
| From engine to power output shaft via first power distributor | k1 · (1 + km) · k3 (= R3) or k1 · (1 + km) · k4 (= R1) (= $\alpha^2 \cdot$ k1 · (1 + km) · k3) | 0.8 or 3.2 |
| From engine to power output shaft via second power distributor | k2 · (1 − kp) · k3 (= R4) (= k1 · (1 + km) · k3/$\alpha$) or k2 · (1 − kp) · k4 (= R2) (= $\alpha \cdot$ k1 · (1 + km) · k3) | 0.4 or 1.6 |

As shown in Table 1, the speed reduction ratio of the rotation transmission system (which corresponds to an input-side first partial rotation transmission system) from the output shaft 1a of the engine 1 to the carrier 4c of the first power distributor 4 (specifically, the speed reduction ratio achieved when the rotational speed of the sun gear 4s is 0) is k1·(1+km), and the speed reduction ratio of the rotation transmission system (which corresponds to an input-side second partial rotation transmission system) from the output shaft 1a of the engine 1 to the carrier 5c of the second power distributor 5 (specifically, the speed reduction ratio achieved when the rotational speed of the sun gear 5s is 0) is k2·(1−kp). Here, the value (1+km) indicates the speed reduction ratio of rotation transmission from the ring gear 4r to the carrier 4c of the first power distributor 4 constituted by a planet gear unit of the single pinion type, and the value (1−kp) indicates the speed reduction ratio of rotation transmission from the ring gear 5r to the carrier 5c of the second power distributor 5 constituted by a planet gear unit of the double pinion type.

Furthermore, the speed reduction ratios of rotation transmission from the output shaft 1a of the engine 1 to the rotation shaft 6a of the first motor 6 and from the output shaft 1a of the engine 1 to the rotation shaft 7a of the second motor 7 are k1·km and k2·kp, respectively. The speed reduction ratio of the rotation transmission system from the output shaft 1a of the engine 1 to the power output shaft 11 via the first power distributor 4 (which corresponds to a first rotation transmission system) is the product of the speed reduction ratio of the rotation transmission system from the engine 1 to the carrier 4c of the first power distributor 4 (that is, the input-side first partial rotation transmission system) and the speed reduction ratio (k3 or k4) of the speed change unit 10, and, therefore, is k1·(1+km)·k3 or k1·(1+km)·k4. Furthermore, in this embodiment, as described above, the speed reduction ratio of rotation transmission from the carrier 5c of the second power distributor 5 to the power output shaft 11 may assume one of two values: the speed reduction ratio k3 of the lower-speed-reduction-ratio rotation transmission mechanism 14; and the speed reduction ratio k4 of the higher-speed-reduction-ratio rotation transmission mechanism 15. Therefore, the speed reduction ratio of the rotation transmission system (which corresponds to a second rotation transmission system) from the output shaft 1a of the engine 1 to the power output shaft 11 via the second power distributor 5 is the product of the speed reduction ratio from the engine 1 to the carrier 5c of the second power distributor 5 and the speed reduction ratio of the speed change unit 10, that is, k2·(1−kp)·k3 or k2·(1−kp)·k4.

According to this embodiment, in this case, the values k1, k2, km and kp are determined in such a manner that the speed reduction ratio of the rotation transmission from the output shaft 1a of the engine 1 to the rotation shaft 6a of the first motor 6 equals to the speed reduction ratio of the rotation transmission from the output shaft 1a of the engine 1 to the rotation shaft 7a of the second motor 7, that is, k1·km=k2·kp. In addition, assuming that the ratio between the speed reduction ratio of the rotation transmission system (that is, the input-side first partial rotation transmission system) from the output shaft 1a of the engine 1 to the carrier 4c of the first power distributor 4 and the reduction ratio of the rotation transmission system (that is, the input-side second partial rotation transmission system) from the output shaft 1a of the engine 1 to the carrier 5c of the second power distributor 5 (=k1·(1+km)/k2·(1−kp)) is $\alpha$ (>1) (this ratio will be referred to as a basic speed reduction ratio $\alpha$), the speed reduction ratio k3 of the lower-speed-reduction-ratio rotation transmission mechanism 14 and the speed reduction ratio k4 of the higher-speed-reduction-ratio rotation transmission mechanism 15 are determined in such a manner that the ratio between the speed reduction ratios k3 and k4 (that is, k4/k3) is the second power (or a power) of the basic speed reduction ratio $\alpha$. For example, k3=1/$\alpha$, and k4=$\alpha$. If the values k3 and k4 are determined in such a manner that k4/k3 =$\alpha^2$, the speed reduction ratio of the rotation transmission system (referred to as a first rotation transmission system, hereinafter) from the output shaft 1a of the engine 1 to the power output shaft 11 via the first power distributor 4 is represented as k1·(1+km)·k3 or $\alpha^2$·k1·(1+km)·k3 (in the case where k3=1/$\alpha$ and k4=$\alpha$, k1·(1+km)·k3=k2·(1−kp) and $\alpha^2$·k1 ·(1+km)·k3 =$\alpha^2$·k2·(1−kp)). In addition, the speed reduction ratio of the rotation transmission system (referred to as a second rotation transmission system, hereinafter) from the output shaft 1a of the engine 1 to the power output shaft 11 via the second power distributor 5 is represented as k1·(1+km)·k3/$\alpha$ or $\alpha$·k1·(1+km)·k3 (in the case where k3=1/$\alpha$ and k4=$\alpha$, k1·(1+km)·k3/$\alpha$=k2·(1−kp)/$\alpha$ and $\alpha$·k1·(1+km)·k3=$\alpha$·k2·(1−kp)).

Therefore, in ascending order of magnitude, the possible values of the speed reduction ratio of the first rotation transmission system (two values, in this embodiment) and the possible values of the speed reduction ratio of the second rotation transmission system (two values, in this embodiment) are k1·(1+km)·k3/$\alpha$, k1·(1+km)·k3, $\alpha$·k1·(1+km)·k3 and $\alpha^2$·k1·(1+km)·k3, which constitutes a geometric progression with a multiplier of $\alpha$. Of the four speed reduction ratios, the minimum one k1·(1+km)·k3/$\alpha$ and the maximum one $\alpha^2$·k1·(1+km)·k3 are the possible minimum and maximum values, respectively, of the speed reduction ratio between the engine 1 and the power output shaft 11 in the speed-variable running described later (that is, the minimum and maximum values of the entire range of the speed reduction ratio between the engine 1 and the power output shaft 11).

Examples of the values k1, k2, km, kp, k3, k4 and the like that satisfy the requirements concerning the speed reduction ratio (that is, k1·km=k2·kp and k4/k3=$\alpha^2$) are shown in the right column of Table 1. In this example, it is assumed that the ratio (=$\alpha^3$) of the maximum value to the minimum value of the entire speed variation range (that is, the entire range of speed reduction ratio) between the engine 1 and the power output shaft 11 is 8, the basic speed reduction ratio $\alpha$ is 2, and k3=1/$\alpha$. In the following description, of the four values of the speed reduction ratio arranged in the geometric progression, the maximum speed reduction ratio $\alpha^2$·k1·(1+km)·k3 is reference symbol R1 and referred to as a first speed reduction ratio R1. Besides, the other three speed reduction ratios R1/$\alpha$, R1/$\alpha^2$ and R1/$\alpha^3$ are referred to as a second speed reduction ratio R2 (=R1 /$\alpha$), a third speed reduction ratio R3 (=R1 /$\alpha^2$) and a fourth speed reduction ratio R4 (=R1/$\alpha^3$), respectively, in descending order of magnitude.

Figure 2:
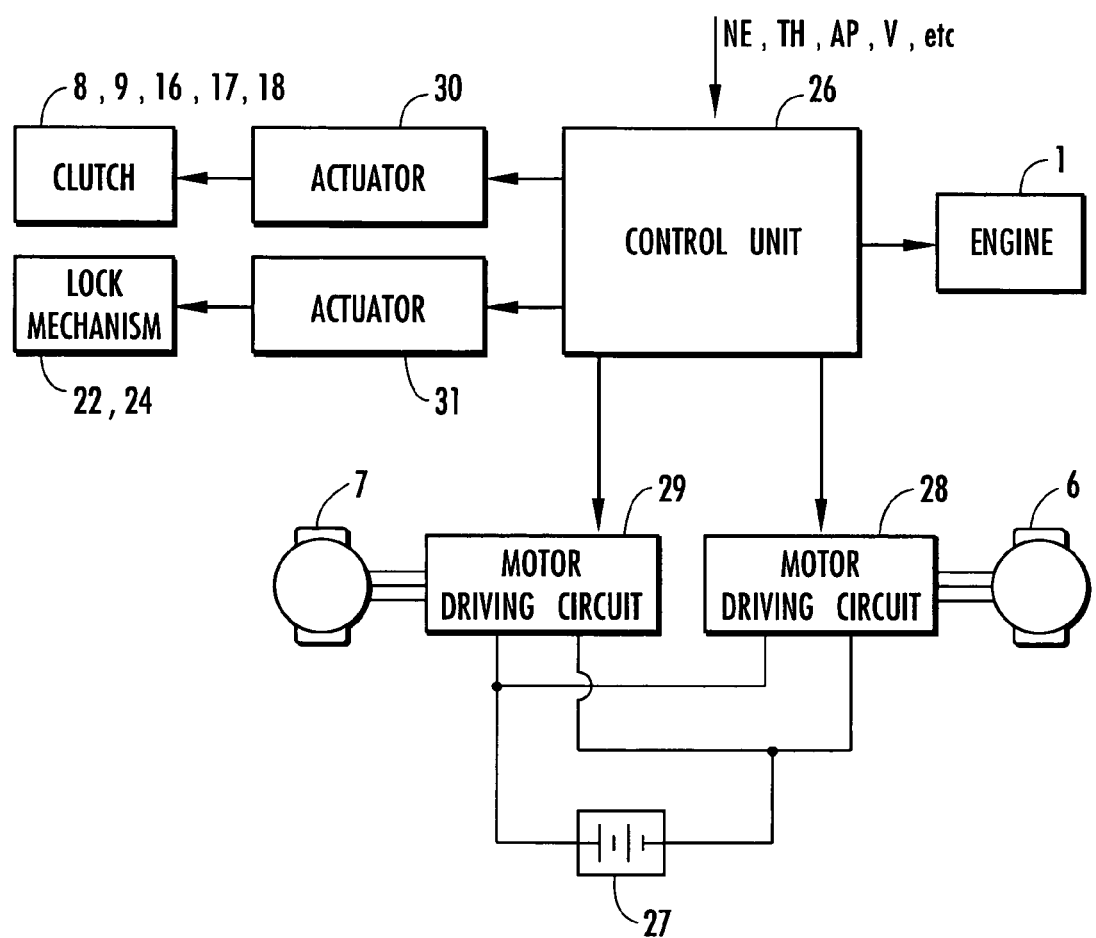
FIG. 2 is a block diagram showing a control system of the power transmission device according to the first embodiment.

In the hybrid vehicle according to this embodiment, a control unit 26 shown in the block diagram of FIG. 2 controls the operations of the engine 1, the motors 6 and 7, the clutches 8 and 9, the clutches 16 to 18 of the speed change unit 10 of the power transmission device 3 (including the engine 1), and the lock mechanisms 22 and 24. The control unit 26 comprises an electronic circuit including a microcomputer and controls the operation of the engine 1 via a fuel injection unit, an ignition unit, an actuator for a throttle valve or the like. In addition, the control unit 26 controls energization of the motors 6 and 7 via motor driving circuits (power drive units) 28 and 29, respectively, which supply electric power to the motors 6 and 7, which are electric motors, from a capacitor 27 serving as a power supply for the motors 6 and 7. Furthermore, the control unit 26 switches the clutches 8, 9, 16 to 18 between the engagement state and the disengagement state via their respective actuators 30. Furthermore, the control unit 26 makes the lock mechanisms 22 and 24 operate via their respective actuators 31 to cause them to prevent or allow rotation of the ring gear 4r of the first power distributor 4 and the carrier 5c of the second power distributor 5, respectively. To achieve the control processing, the control unit 26 receives detection data including the number of revolutions (rotational speed) NE of the engine 1, the opening of the throttle value TH, the accelerator manipulation amount AP of the vehicle and the vehicle speed V from a sensor (not shown). While only one actuator 30 is shown in FIG. 2 for convenience, the clutches 8, 9, 16 to 18 actually have their respective actuators 30. The same holds true for the actuator 31.

Now, an operation of the power transmission device 3 according to this embodiment will be described in detail. In order to make the vehicle run using the power from the engine 1 while varying the speed (changing the speed reduction ratio) between the engine 1 and the power output shaft 11, that is, in order to achieve speed-variable running, the control unit 26 controls the clutches 8 and 9 to be in the engagement state. In addition, the lock mechanisms 22 and 24 are controlled to be in a release state, that is, not to prevent rotation of the ring gear 4r of the first power distributor 4 and the carrier 5c of the second power distributor 5, respectively.

With the clutches 8 and 9 and the lock mechanisms 22 and 24 controlled to operate in this way, the control unit 26 determines a required running torque of the vehicle based on the accelerator manipulation amount AP and the vehicle speed V using a map or the like and then determines a speed variable range of the power transmission device 3 based on the required running torque and the vehicle speed V using a map or the like. In this case, the speed variable range is a speed variable range between the first speed reduction ratio R1 and the second speed reduction ratio R2 (referred to as a first speed variable range, hereinafter), a speed variable range between the second speed reduction ratio R2 and the third speed reduction ratio R3 (referred to as a second speed variable range, hereinafter), or a speed variable range between the third speed reduction ratio R3 and the fourth speed reduction ratio R4 (referred to as a third speed variable range, hereinafter). The first, second and third speed variable ranges are basically used for a low speed range, a medium speed range and a high speed range, respectively.

Figure 3:
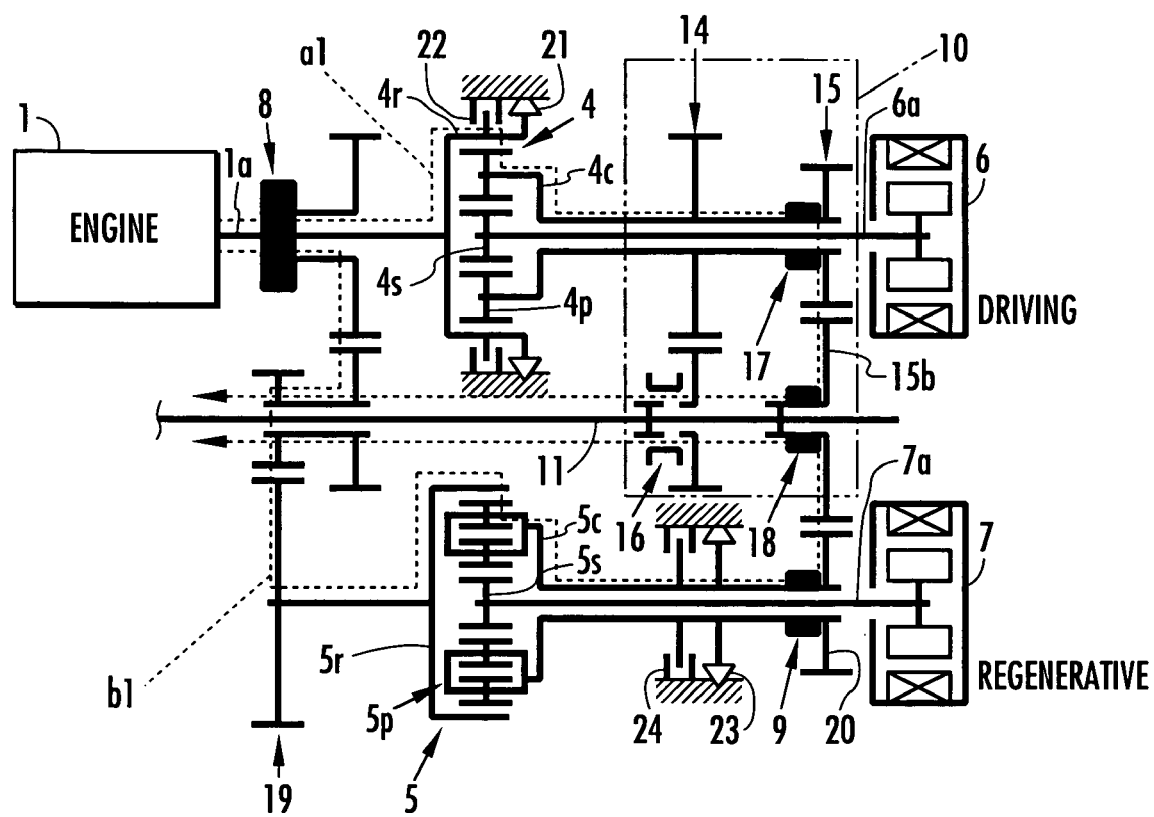
FIG. 3 is a diagram for illustrating an operation of the power transmission device according to the first embodiment.
Figure 4:
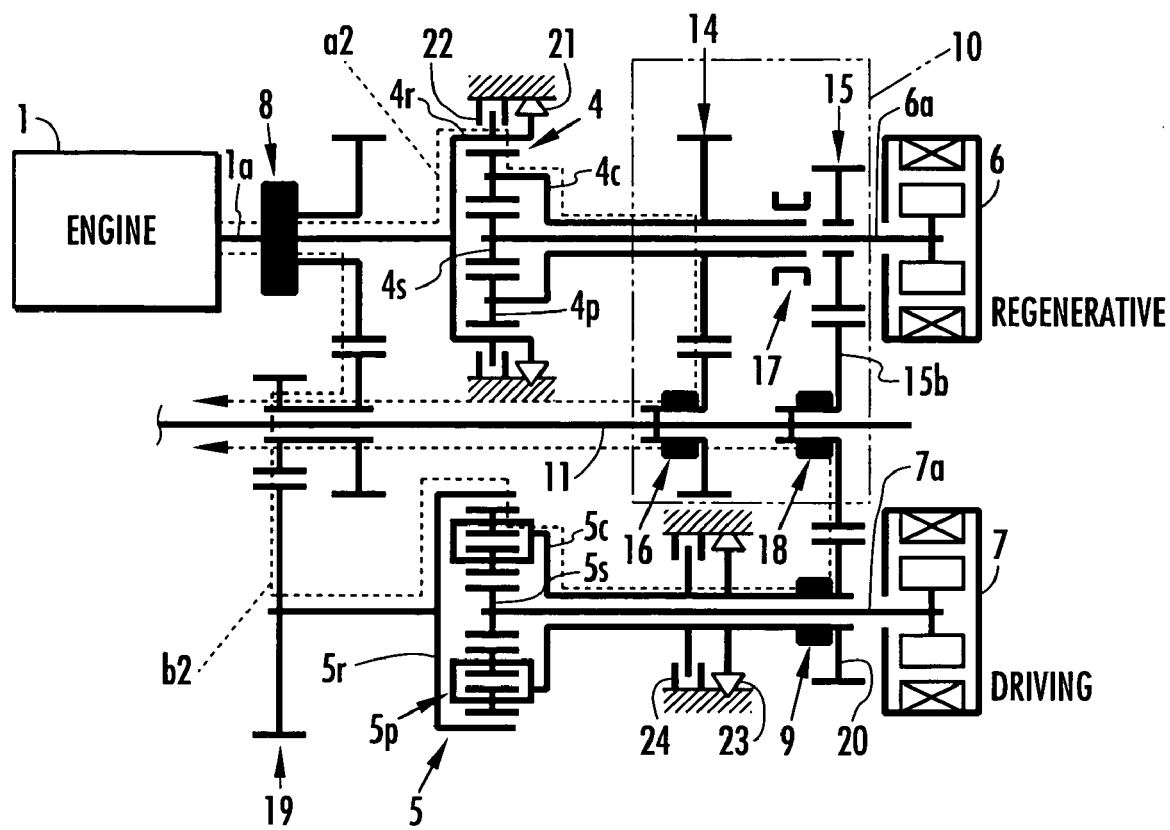
FIG. 4 is a diagram for illustrating an operation of the power transmission device according to the first embodiment.
Figure 5:
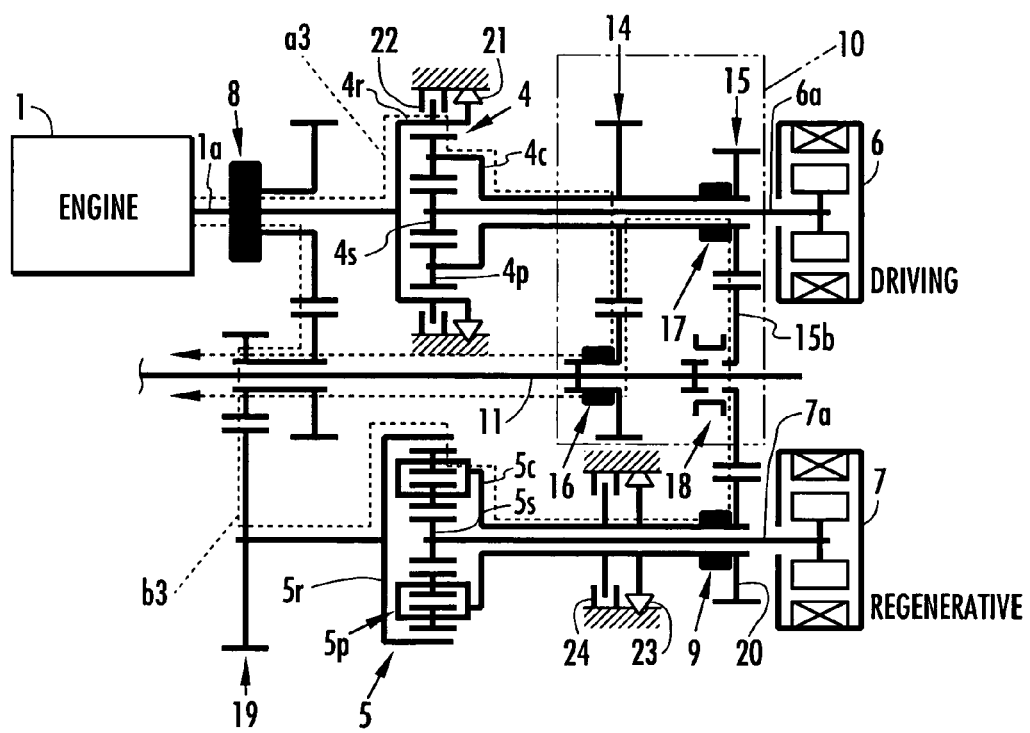
FIG. 5 is a diagram for illustrating an operation of the power transmission device according to the first embodiment.

Depending on the speed variable ranges determined, the control unit 26 operates the clutches 16 to 18 of the speed change unit 10 as shown in FIGS. 3 to 5. FIGS. 3 to 5 concern the first, second and third speed variable ranges, respectively. In these drawings, as for the clutches 16 to 18, those in the engagement state are shown as solidly-shaded ones, and those in the disengagement state are shown as hollow ones. The same holds true for the clutches 8 and 9. However, since the clutches 8 and 9 are always in the engagement state during the speed variable running, they are solidly shaded in all of FIGS. 3 to 5.

In the first speed variable range, the clutches 17 and 18 of the speed change unit 10 are in the engagement state, and the clutch 16 is in the disengagement state, as shown in FIG. 3. In this state, the speed reduction ratio of the first rotation transmission system on the side of the first power distributor 4 and the speed reduction ratio of the second rotation transmission system on the side of the second power distributor 5 are the first speed reduction ratio R1 and the second speed reduction ratio R2, respectively. In addition, in this state, when the torques generated by the motors 6 and 7 are controlled as described later, some of the output torque of the engine 1 is transmitted from the engine 1 to the power output shaft 11 via the ring gear 4r, planetary gear 4p and carrier 4c of the first power distributor 4 and the higher-speed-reduction-ratio rotation transmission mechanism 15 in this order, as indicated by the broken-line arrow a1 in this drawing. The remainder of the output torque of the engine 1 is transmitted from the engine 1 to the power output shaft 11 via the rotation transmission system 19, the ring gear 5r, planetary gear pair 5p and carrier 5c of the second power distributor 5, the gear 20 and the gear 15b of the higher-speed-reduction-ratio rotation transmission mechanism 15 in this order, as indicated by the broken-line arrow b1 in this drawing.

In the second speed variable range, the clutches 16 and 18 of the speed change unit 10 are in the engagement state, and the clutch 17 is in the disengagement state, as shown in FIG. 4. In this state, the speed reduction ratio of the first rotation transmission system on the side of the first power distributor 4 and the speed reduction ratio of the second rotation transmission system on the side of the second power distributor 5 are the third speed reduction ratio R3 and the second speed reduction ratio R2, respectively. In addition, in this state, when the torques generated by the motors 6 and 7 are controlled as described later, some of the output torque of the engine 1 is transmitted from the engine 1 to the power output shaft 11 via the ring gear 4r, planetary gear 4p and carrier 4c of the first power distributor 4 and the lower-speed-reduction-ratio rotation transmission mechanism 14 in this order, as indicated by the broken-line arrow a2 in this drawing. The remainder of the output torque of the engine 1 is transmitted to the power output shaft 11 via the second power distributor 5 along the same route as that for the first speed variable range, as indicated by the broken-line arrow b2 in this drawing.

In the third speed variable range, the clutches 16 and 17 are in the engagement state, and the clutch 18 is in the disengagement state, as shown in FIG. 5. In this state, the speed reduction ratio of the first rotation transmission system on the side of the first power distributor 4 and the speed reduction ratio of the second rotation transmission system on the side of the second power distributor 5 are the third speed reduction ratio R3 and the fourth speed reduction ratio R4, respectively. In addition, in this state, when the torques generated by the motors 6 and 7 are controlled as described later, some of the output torque of the engine 1 is transmitted to the power output shaft 11 via the first power distributor 4 along the same route as that for the second speed variable range, as indicated by the broken-line arrow a3 in this drawing. The remainder of the output torque of the engine 1 is transmitted from the engine 1 to the power output shaft 11 via the rotation transmission mechanism 19, the ring gear 5r, planetary gear pair 5p and carrier 5c of the second power distributor 5, the gear 20, the higher-speed-reduction-ratio rotation transmission mechanism 15 and the lower-speed-reduction-ratio rotation transmission mechanism 14 in this order, as indicated by the broken-line arrow b3 in this drawing.

Based on the required running torque and the vehicle speed V, the control unit 26 determines a target output of the engine 1 that can provide the required running torque and the vehicle speed V. Furthermore, it determines an operational point that allows the target output to be most efficiently produced in the determined speed variable range (that is, an operational point that results in the least fuel consumption), that is, a combination of target output torque and target number of revolutions of the engine 1. The control unit 26 controls the opening of the throttle valve (not shown) of the engine 1 in accordance with the target output torque and determines the target load torque of the engine 1 by correcting the target output torque based on the difference between the target number of revolutions and the actual number of revolutions NE (detection value). For example, the target load torque is determined by correcting the target output torque using a manipulation quantity determined by a feedback control rule, such as PI control rule, from the difference between the target number of revolutions and the actual number of revolutions NE (detection value). Furthermore, the control unit 26 determines target torques of the motors 6 and 7 based on the determined target load torque and a target driving torque to be generated on the power output shaft 11 for the required running torque, as described below.

Given that reference character Te denotes the load torque of the engine 1, reference character Tv denotes the driving torque of the power output shaft 11, reference character T1 denotes the torque generated by the first motor 6, reference character T2 denotes the torque generated by the second motor 7, reference character β1 denotes the speed reduction ratio of rotation transmission from the output shaft 1a of the engine 1 to the first motor 6, reference character β2 denotes the speed reduction ratio of rotation transmission from the output shaft 1a of the engine 1 to the second motor 7, reference character γ1 denotes the speed reduction ratio of rotation transmission from the rotation shaft 6a of the first motor 6 to the power output shaft 11, and reference character γ2 denotes the speed reduction ratio of rotation transmission from the rotation shaft 7a of the second motor 7 to the power output shaft 11, the following equations (1) and (2) hold in the steady state.

$$Te=(1/\beta 1)\cdot T1+(1/\beta 2)\cdot T2 \qquad (1)$$

$$Tv=\gamma 1\cdot T1+\gamma 2\cdot T2 \qquad (2)$$

Using the characters in Table 1, the speed reduction ratios β1 and β2 are represented as β1=k1·km and β2=k2·kp (=β1). Besides, the speed reduction ratios γ1 and γ2 depend on the speed variable range (the first to third speed variable ranges) Specifically, in the first speed variable range shown in FIG. 3, the speed reduction ratio of rotation transmission from the carrier 4c of the first power distributor 4 to the power output shaft 11 and the speed reduction ratio of rotation transmission from the carrier 5c of the second power distributor 5 to the power output shaft 11 are both k4 (which equals to the speed reduction ratio of the higher-speed-reduction-ratio rotation transmission mechanism 15). Therefore, the speed reduction ratios γ1 and γ2 are represented as γ1=ka·k4 and γ2=kb·k4, where reference character ka denotes the speed reduction ratio of rotation transmission from the rotation shaft 6a of the first motor 6 to the carrier 4c of the first power distributor 4, and reference character kb denotes the speed reduction ratio of rotation transmission from the rotation shaft 7a of the second motor 7 to the carrier 5c of the second power distributor 5. In the power transmission device 3 configured according to this embodiment, the speed reduction ratios ka and kb are represented as ka=(1+km)/km and kb=(1−kp)/kp. Alternatively, in the second speed variable range shown in FIG. 4, the speed reduction ratio of rotation transmission from the carrier 4c of the first power distributor 4 to the power output shaft 11 and the speed reduction ratio of rotation transmission from the carrier 5c of the second power distributor 5 to the power output shaft 11 are k3 and k4, respectively. Therefore, the speed reduction ratios γ1 and γ2 are represented as γ1=ka·k3 and γ2=kb·k4. Alternatively, in the third speed variable range shown in FIG. 5, the speed reduction ratio of rotation transmission from the carrier 4c of the first power distributor 4 to the power output shaft 11 and the speed reduction ratio of rotation transmission from the carrier 5c of the second power distributor 5 to the power output shaft 11 are both k3 (which equals to the speed reduction ratio of the lower-speed-reduction-ratio rotation transmission mechanism 14). Therefore, the speed reduction ratios γ1 and γ2 are represented as γ1=ka·k3 and γ2=kb·k3.

The control unit 26 determines the target torques T1 and T2 of the motors 6 and 7, respectively, using the formulas (1) and (2) based on the target load torque Te of the engine 1 and the target driving torque Tv of the power output shaft 11 determined as described above. Then, based on the target torques T1 and T2, the control unit 26 controls the current passing through the motors 6 and 7, thereby causing the motors 6 and 7 to produce the target torques T1 and T2, respectively.

When the engine 1 and the motors 6 and 7 are controlled as described above, essentially, in each of the first to third speed variable ranges, either one of the motors 6 and 7 which is associated with the higher one of the speed reduction ratios at the ends of the speed variable range is controlled to be in a driving state in which it generates a driving torque (powering torque), and the other which is associated with the lower one of the speed reduction ratios is controlled to be in a regenerative state (that is, a electric-power-generating state) in which it generates a regenerative torque. Specifically, in the first speed variable range, the first motor 6 is controlled to be in the driving state, and the second motor 7 is controlled to be in the regenerative state. In the second speed variable range, the first motor 6 is controlled to be in the regenerative state, and the second motor 7 is controlled to be in the driving state. In the third speed variable range, the first motor 6 is controlled to be in the driving state, and the second motor 7 is controlled to be in the regenerative state. In any of the speed variable ranges, in the steady state, the power consumed by the motor 6 or 7 in the driving state is balanced with the power generated by the motor 7 or 6 in the regenerative state (that is, the power consumed≦the power generated). That is, some of the output energy of the engine 1 is transmitted to the power output shaft 11 via the motor 7 or 6 in the regenerative state and the motor 6 or 7 in the driving state. At this time, the vehicle can run at a variable speed by achieving a speed varying operation with a speed change ratio between the speed reduction ratios at the ends of each speed variable range and transmitting the output torque of the engine 1 to the power output shaft 11.

Although it will not be described in detail because it is not concerned with the essence of the present invention, the power transmission device 3 according to this embodiment can allow the vehicle to run only by the driving torque of the first motor 6 or second motor 7 without using the power of the engine 1. In such a case, the clutches 8 and 9 are disengaged. Furthermore, for example, the clutch 16 of the speed change unit 10 is disengaged, and the clutches 17 and 18 are engaged. In this state, if the first motor 6 is caused to generate a driving torque with the ring gear 4r of the first power distributor 4 being prevented from rotating by the one-way clutch 21 or lock mechanism 22, the driving torque can be transmitted to the power output shaft 11 to achieve running (so-called EV running) of the vehicle. Alternatively, in the same state, if the second motor 7 is caused to generate a driving torque with the carrier 5c of the second power distributor 5 being prevented from rotating by the one-way clutch 23 or lock mechanism 24, the driving torque can be transmitted to the output shaft 1a of the engine 1 to start the engine 1. Furthermore, if, once the engine 1 starts, the rotational torque of the engine 1 is transmitted to the second motor 7 to cause the second motor 7 to regenerate electric power with the carrier 5c of the second power distributor 5 being prevented from rotating by the one-way clutch 23 or lock mechanism 24, EV running can be achieved by the first motor 6 while the second motor 7 regenerates electric power (that is, charges the capacitor 27) using the power of the engine 1 (that is, so-called series-type EV running can be achieved).

As described above, in this embodiment, since the speed reduction ratio of the rotation transmission system (input-side first partial rotation transmission system) from the engine 1 to the carrier 4c (first output shaft) of the first power distributor 4 is different from the speed reduction ratio of the rotation transmission system (input-side second partial rotation transmission system) from the engine 1 to the carrier 5c (first output shaft) of the second power distributor 5 (see Table 1), the vehicle can run at a variable speed in a plurality of speed variable ranges (first to third speed variable ranges) while sharing the components of the speed change unit 10 for rotation transmission from each carrier 4c, 5c to the power output shaft 11. Thus, the vehicle can run while changing the speed widely with the small power transmission device 3. Thus, the vehicle can run while making the engine 1 operate at an operational point of the highest possible efficiency and assuring the running performance (required torque) of the vehicle. In addition, since a plurality of speed variable ranges can be provided, the ratio of the maximum speed reduction ratio to the minimum speed reduction ratio (maximum speed reduction ratio/minimum speed reduction ratio) of rotation transmission from the engine 1 to the power output shaft 11 for each speed variable range can be kept small. As a result, the part of the power of the engine 1 which is transmitted from the motor 6 or 7 in the regenerative state to the power output shaft 11 via the motor 7 or 6 in the driving state during the speed-variable running can be reduced. Thus, the energy loss in the transmission of the power of the engine 1 to the power output shaft 11 can be reduced, so that the power of the engine 1 can be transmitted to the power output shaft 11 with a high efficiency, and thus, the energy efficiency of the vehicle can be improved.

Furthermore, since the speed reduction ratios k3 and k4 of the lower-speed-reduction-ratio rotation transmission mechanism 14 and higher-speed-reduction-ratio rotation transmission mechanism 15, respectively, of the speed change unit 10 are determined in such a manner that the ratio between the speed reduction ratios k3 and k4 (that is, k4/k3) is the second power (or a power) of the basic speed reduction ratio α, the ratio between the minimum speed reduction ratio and the maximum speed reduction ratio is constant for all the speed variable ranges. In addition, in this embodiment, the speed reduction ratios of rotation transmission from the engine 1 to the motors 6 and 7 are equal. Thus, the maximum values of the torque that the motors 6 and 7 have to generate in each speed variable range are equal. As a result, the capacities of the motors 6 and 7 can be reduced to a minimum, so that relatively small motors can be used as the motors 6 and 7.

Figure 6:
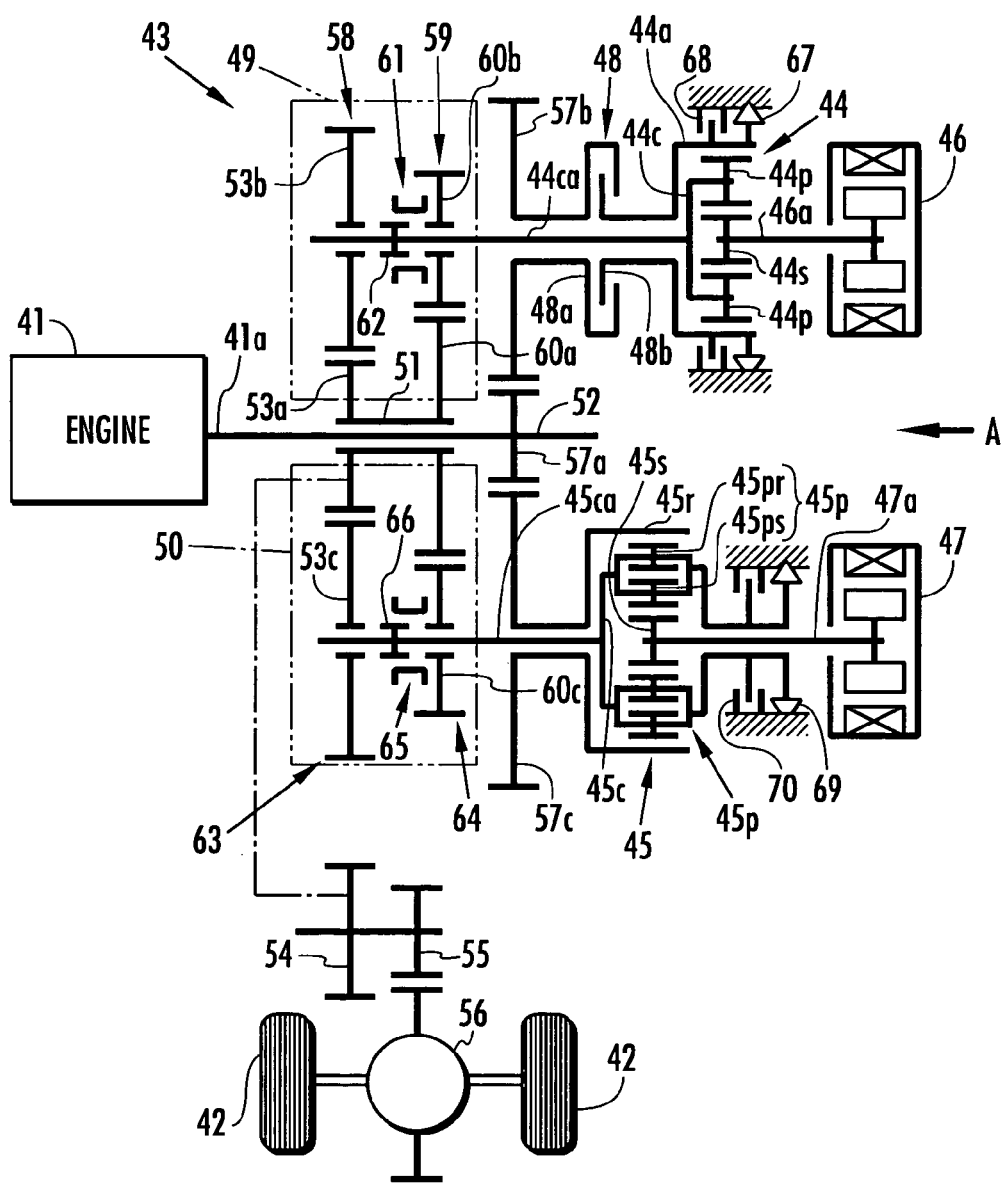
FIG. 6 is a schematic system diagram showing a whole arrangement of a hybrid vehicle provided with a power transmission device according to a second embodiment of the present invention.

Now, a second embodiment of the present invention will be described with reference to FIGS. 6 and 7. FIG. 6 is a schematic system diagram showing a whole arrangement of a hybrid vehicle provided with a power transmission device according to this embodiment. Reference numeral 41 denotes an engine, reference numerals 42, 42 each denote a driving wheel of he vehicle, and reference numeral 43 denotes a power transmission device.

As essential mechanical elements, the power transmission device 43 according to this embodiment comprises a first power distributor 44, a second power distributor 45, a first motor 46, a second motor 47, a clutch 48, two speed change units 49 and 50 and a power output shaft 51. The power output shaft 51 is concentrically connected to an output shaft 41a of the engine 41 and fitted onto a power input shaft 52 capable of rotating integrally with the output shaft 41a and can relatively rotate with respect to the power input shaft 52. The power output shaft 51 is linked with the driving wheels 42, 42 via a gear 53a capable of rotating integrally therewith, an idle gear 54 meshing with the gear 53a, an idle gear 55 capable of rotating integrally with the idle gear 54 and a differential gear unit 56 (differential bevel gear unit) meshing with the idle gear 55, so that the power output shaft 51 can rotate in association with the driving wheels 42, 42. Here, the alternate long and short dash line in this drawing indicates that the gear 53a meshes with the idle gear 54. The gear 53a is a component of the speed change units 49, 50, which will be described in detail later.

As with the first power distributor 4 in the first embodiment, the first power distributor 44 is constituted by a planet gear unit of the single-pinion type and comprises a ring gear 44r serving as an input shaft, a sun gear 44s serving as a second output shaft, a plurality of pinion gears 44p spaced apart from each other along the circumference of the sun gear 44s, and a carrier 44c serving as a first output shaft for shaft-supporting the pinion gears 44p. The sun gear 44s is concentrically connected to a rotation shaft 46a of the first motor 46 and can rotate integrally with the rotation shaft 46a.

As with the second power distributor 5 in the first embodiment, the second power distributor 45 is constituted by a planet gear unit of the double-pinion type and comprises a ring gear 45r serving as an input shaft, a sun gear 45s serving as a second output shaft, a plurality of pairs of pinion gears 45p (pairs of pinion gears 45pr and 45ps meshing with each other) spaced apart from each other along the circumference of the sun gear 45s, and a carrier 45c serving as a first output shaft for shaft-supporting the pinion gears 45pr and 45ps of the pinion gear pairs 45p. The sun gear 45s is concentrically connected to a rotation shaft 47a of the second motor 47 and can rotate integrally with the rotation shaft 47a.

The power input shaft 52 is connected to an input port 48a of the clutch 48 via a gear 57a capable of rotating integrally with the power input shaft 52 and a gear 57b meshing with the gear 57a. The clutch 48 may be a friction-type one, for example. The gear 57b is connected to the input port 48a of the clutch 48 so that it can rotate integrally therewith. The gear 57b and the clutch 48 are arranged concentrically with the sun gear 44s of the first power distributor 44 on the side of the first power distributor 44 opposite to the first motor 46. An output port 48b of the clutch 48 is connected to the ring gear 44r of the first power distributor 44 so that it can rotate integrally with the ring gear 44r. Thus, when the clutch 48 is in the engagement state, any rotation of the output shaft 41a of the engine 41 is transmitted to the ring gear 44r of the first power distributor 44 via the power input shaft 52, the gear 57a, the gear 57b and the clutch 48 in this order.

The gear 57a on the power input shaft 52 meshes not only with the gear 57b but also with a gear 57c, which is connected to the ring gear 45r of the second power distributor 45 in such a manner that it can rotate integrally therewith. Thus, any rotation of the output shaft 41a of the engine 41 is transmitted to the ring gear 45r of the second power distributor 45 via the power input shaft 52, the gear 57a and the gear 57c in this order.

The gear 57c is arranged concentrically with the sun gear 45s of the second power distributor 45 on the side of the second power distributor 45 opposite to the second motor 47. In addition, a shaft portion 45ca of the carrier 45c of the second power distributor 45 extends toward the gear 57c (that is, in the direction opposite to the second motor 47, or in the same direction as the shaft portion 44ca of the carrier 44c of the first power distributor 44) and passes through the shaft center of the gear 57c in such a manner that it can relatively rotate with respect to the gear 57c.

Figure 7:
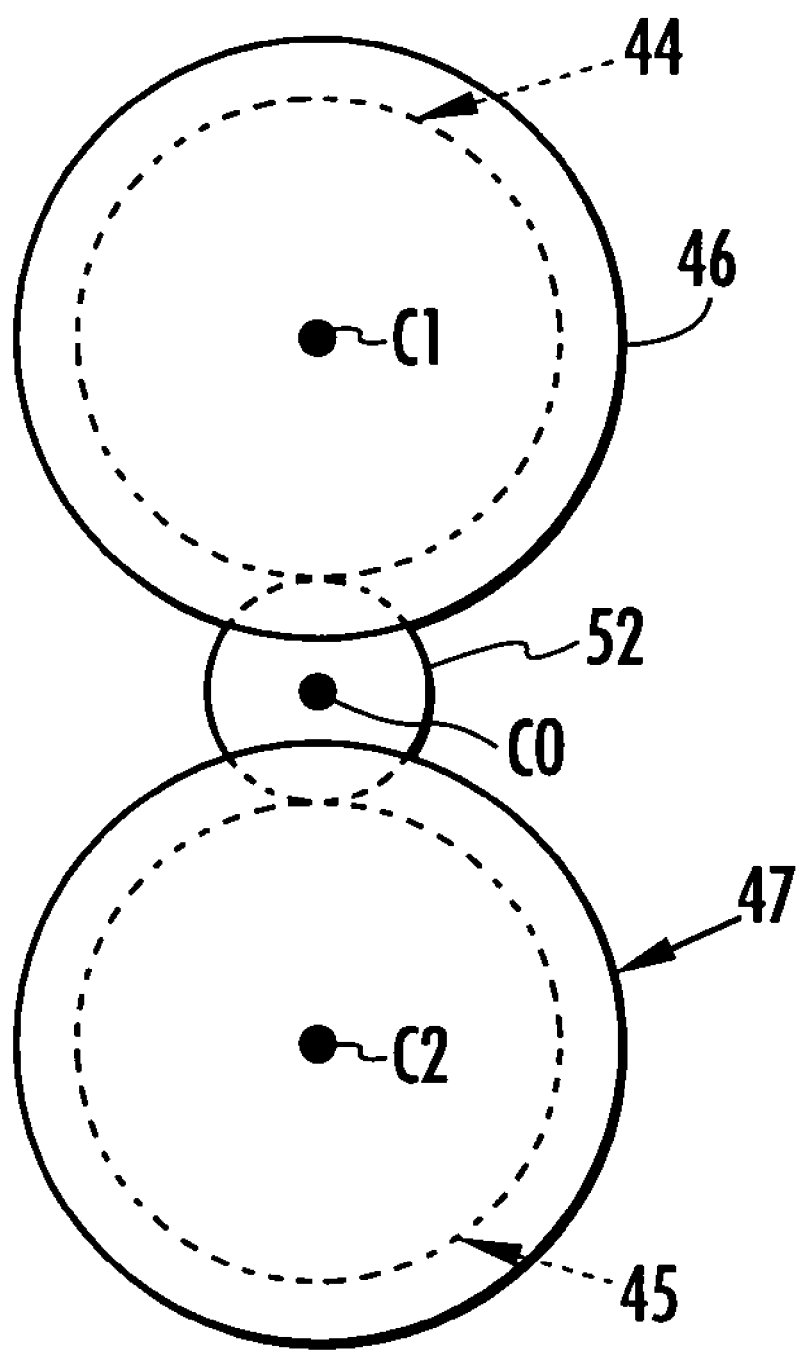
FIG. 7 shows a positional relationship between a power input shaft and a motor, viewed from the direction indicated by the arrow A in FIG. 6.

FIG. 7 shows a positional relationship among the power distributors 44, 45, the motors 46, 47 and the power input shaft 52. FIG. 7 shows them viewed from the direction of the arrow A in FIG. 6. As shown in FIG. 7, the shaft center C1 of the first power distributor 44 and first motor 46 and the shaft center C2 of the second power distributor 45 and second motor 47 are positioned symmetrically with respect to the shaft center C0 of the power input shaft 52. The distance between the shaft centers C1 and C0 is equal to the distance between the shaft centers C2 and C0, and therefore, the gears 57b and 57c (not shown in FIG. 7) have the same diameter and the same number of teeth. Therefore, in this embodiment, the speed reduction ratio of the rotation transmission system from the output shaft 41a of the engine 41 to the ring gear 44r as the input shaft of the first power distributor 44 is equal to the speed reduction ratio of the rotation transmission system from the output shaft 41a of the engine 41 to the ring gear 45r as the input shaft of the second power distributor 45.

Returning to FIG. 6, the shaft portion 44ca of the carrier 44c of the first power distributor 44 passing through the shaft centers of the clutch 48 and gear 57b is connected to the power output shaft 51 via the speed change unit 49 (which corresponds to the first speed change unit according to the present invention). The speed change unit 49 can change the speed reduction ratio of rotation transmission from the carrier 44c to the power output shaft 51 in a plurality of (two, in this embodiment) stages and has rotation transmission mechanisms 58 and 59 responsible for rotation transmission at the respective speed reduction ratios. The speed reduction ratio of the rotation transmission mechanism 58 should be lower than that of the rotation transmission mechanism 59. Thus, in the following description, the rotation transmission mechanisms 58 and 59 will be referred to as a lower-speed-reduction-ratio rotation transmission mechanism 58 and a higher-speed-reduction-ratio rotation transmission mechanism 59, respectively.

Of the rotation transmission mechanisms 58 and 59, the lower-speed-reduction-ratio rotation transmission mechanism 58 comprises a gear 53a on the power output shaft 51 and a gear 53b meshing with the gear 53a and provided concentrically with the carrier 44c. The gear 53b is borne by the shaft portion 44ca of the carrier 44c in such a manner that it can relatively rotate with respect to the shaft portion 44ca. The higher-speed-reduction-ratio rotation transmission mechanism 59 comprises a gear 60a capable of rotating integrally with the power output shaft 51 and a gear 60b meshing with the gear 60a and provided concentrically with the carrier 44c. Furthermore, between the rotation transmission mechanisms 58 and 59, there is also provided a clutch 61 that engages and disengages the rotation transmission between the gear 53b and the shaft portion 44ca of the carrier 44c and the rotation transmission between the gear 60b and the shaft portion 44ca of the carrier 44c. The clutch 61 can move along the shaft portion 44ca of the carrier 44c between the gears 53b and 60b. The clutch 61 can switch among the state in which a member 62 fixed to the shaft portion 44ca of the carrier 44c between the gears 53b and 60b is integrally-rotatably connected to the gear 53b via spline fitting or the like so that the gear 53b and the carrier 44c can rotate integrally, the state in which the member 62 is integrally-rotatably connected to the gear 60b via spline fitting or the like so that the gear 60b and the carrier 44c can rotate integrally, and the state in which the member 62 is separated from the gears 53b and 60b so that any rotation is not transmitted between the carrier 44c and the gears 53b, 60b (that is, the state in which any rotation transmission between the carrier 44c and the power output shaft 51 is disengaged).

Thus, in the speed change unit 49, when the clutch 61 connects the gear 60b and the member 62 to each other, the rotation transmission from the carrier 44c to the power output shaft 51 is achieved via the higher-speed-reduction-ratio rotation transmission mechanism 59, and the speed reduction ratio of the rotation transmission is that of the higher-speed-reduction-ratio rotation transmission mechanism 59. Or, when the clutch 61 connects the gear 53b and the member 62 to each other, the rotation transmission from the carrier 44c to the power output shaft 51 is achieved via the lower-speed-reduction-ratio rotation transmission mechanism 58, and the speed reduction ratio of the rotation transmission is that of the lower-speed-reduction-ratio rotation transmission mechanism 58.

On the other hand, the shaft portion 45ca of the carrier 45c of the second power distributor 45 passing through the shaft center of the gear 57c is connected to the power output shaft 51 via a speed change unit 50 (which corresponds to a second speed change unit according to the present invention). The speed change unit 50 can change the speed reduction ratio of rotation transmission from the carrier 45c to the power output shaft 51 in a plurality of (two, in this embodiment) stages and has rotation transmission mechanisms 63 and 64 responsible for rotation transmission at the respective speed reduction ratios. The speed reduction ratio of the rotation transmission mechanism 63 should be lower than that of the rotation transmission mechanism 64. Thus, in the following description, the rotation transmission mechanisms 63 and 64 will be referred to as a lower-speed-reduction-ratio rotation transmission mechanism 63 and a higher-speed-reduction-ratio rotation transmission mechanism 64, respectively.

Of the rotation transmission mechanisms 63 and 64, the lower-speed-reduction-ratio rotation transmission mechanism 63 comprises the gear 53a on the power output shaft 51 and a gear 53c meshing with the gear 53a and provided concentrically with the carrier 45c. The gear 53c is borne by the shaft portion 45ca of the carrier 45c in such a manner that it can relatively rotate with respect to the shaft portion 45ca. The higher-speed-reduction-ratio rotation transmission mechanism 64 comprises the gear 60a on the power output shaft 51 and a gear 60c meshing with the gear 60a and provided concentrically with carrier 45c. The gear 60c is borne by the shaft portion 45ca of the carrier 45c in such a manner that it can relatively rotate with respect to the shaft portion 45ca. Furthermore, between the rotation transmission mechanisms 63 and 64, there is also provided a clutch 65 that engages and disengages the rotation transmission between the gear 53c and the shaft portion 45ca of the carrier 45c and the rotation transmission between the gear 60c and the shaft portion 45ca of the carrier 45c. As with the clutch 61 in the speed change unit 49, the clutch 65 can move and switch among the state in which a member 66 fixed to the shaft portion 45ca of the carrier 45c between the gears 53c and 60c is integrally-rotatably connected to the gear 53c via spline fitting or the like so that the gear 53c and the carrier 45c can rotate integrally, the state in which the member 66 is integrally-rotatably connected to the gear 60c via spline fitting or the like so that the gear 60c and the carrier 45c can rotate integrally, and the state in which the member 66 is separated from the gears 53c an 60c so that any rotation is not transmitted between the carrier 45c and the gears 53c, 60c (that is, the state in which any rotation transmission between the carrier 45c and the power output shaft 51 is disengaged).

Thus, in the speed change unit 50, when the clutch 65 connects the gear 60c and the member 66 to each other, the rotation transmission from the carrier 45c to the power output shaft 51 is achieved by the higher-speed-reduction-ratio rotation transmission mechanism 64, and the speed reduction ratio of the rotation transmission is that of the higher-speed-reduction-ratio rotation transmission mechanism 64. Or, when the clutch 65 connects the gear 53c and the member 66 to each other, the rotation transmission from the carrier 45c to the power output shaft 51 is achieved by the lower-speed-reduction-ratio rotation transmission mechanism 63, and the speed reduction ratio of the rotation transmission is that of the lower-speed-reduction-ratio rotation transmission mechanism 63.

The gears 53a to 53c and 60a to 60c in the speed change units 49 and 50 each correspond to a rotational member according to the present invention. The clutches 61 and 65 may be dog clutches or ones using friction force, other than those using spline fitting. Furthermore, the rotation transmission mechanisms in the speed change units 49 and 50 may be ones that achieve rotation transmission using a sprocket and a chain, for example.

As described above, in this embodiment, the shaft center of the sun gear 44s of the first power distributor 44 and the shaft center of the sun gear 45s of the second power distributor 45 are positioned symmetrically with respect to the shaft center of the power input shaft 52 (which corresponds with the shaft center of the power output shaft 51). Therefore, the shaft center of the carrier 44c of the first power distributor 44 and the shaft center of the carrier 45c of the second power distributor 45 are positioned symmetrically with respect to the shaft center of the power input shaft 51. In addition, the lower-speed-reduction-ratio rotation transmission mechanism 58 of the speed change unit 49 and the lower-speed-reduction-ratio rotation transmission mechanism 63 of the speed change unit 50 share the gear 53a on the power output shaft 51. Similarly, the higher-speed-reduction-ratio rotation transmission mechanism 59 of the speed change unit 49 and the higher-speed-reduction-ratio rotation transmission mechanism 64 of the speed change unit 50 share the gear 60a on the power output shaft 51. Thus, the gear 53b of the lower-speed-reduction-ratio rotation transmission mechanism 58 of the speed change unit 49 and the gear 53c of the lower-speed-reduction-ratio rotation transmission mechanism 63 of the speed change unit 50 have the same diameter (same number of teeth). Therefore, the lower-speed-reduction-ratio rotation transmission mechanisms 58, 63 of the speed change units 49, 50 have an equal speed reduction ratio. Similarly, the gear 60b of the higher-speed-reduction-ratio rotation transmission mechanism 59 of the speed change unit 49 and the gear 60c of the higher-speed-reduction-ratio rotation transmission mechanism 64 of the speed change unit 50 have the same diameter (same number of teeth), and therefore, the higherspeed-reduction-ratio rotation transmission mechanisms 59, 64 of the speed change units 49, 50 have an equal speed reduction ratio.

In FIG. 6, as with the one-way clutch 21 and the lock mechanism 22 in the first embodiment, reference numerals 67 and 68 denote a one-way clutch and a lock mechanism, respectively, which appropriately prevent rotation of the ring gear 44r of the first power distributor 44. Furthermore, as with the one-way clutch 23 and the lock mechanism 24 in the first embodiment, reference numerals 69 and 70 denote a one-way clutch and a lock mechanism, respectively, which appropriately prevent rotation of the carrier 45c of the second power distributor 45.

Now, the speed reduction ratio of the rotation transmission system of the power transmission device 43 in this embodiment will be described. As in the first embodiment shown in Table 1, the speed reduction ratio of the rotation transmission system from the output shaft 41a of the engine 41 to the ring gear 44r as the input shaft of the first power distributor 44 is k1, the speed reduction ratio of the rotation transmission system from the output shaft 41a of the engine 41 to the ring gear 45r as the input shaft of the second power distributor 45 is k2, the speed reduction ratio from the ring gear 44r to the sun gear 44s of the first power distributor 44 is km, and the speed reduction ratio from the ring gear 45r to the sun gear 45s of the second power distributor 45 is kp. Furthermore, the speed reduction ratio of the lower-speed-reduction-ratio rotation transmission mechanisms 58 and 63 of the speed change units 49 and 50 (that is, the gear ratio of the gear 53a to the gear 53b or 53c (ratio of number of teeth)) is k3, and the speed reduction ratio of the higher-speed-reduction-ratio rotation transmission mechanisms 59 and 64 of the speed change units 49 and 50 (that is, the gear ratio of the gear 60a to the gear 60b or 60c (ratio of number of teeth)) is k4 (>k3). As shown in Table 1, the speed reduction ratios of rotation transmission from the output shaft 41a of the engine 41 to the motors 46 and 47 are k1·km and k2·kp, respectively. Furthermore, the speed reduction ratios k1·km and k2·kp are set to an equal value, as in the first embodiment. In this case, since k1=k2 in the power transmission device 43 configured according to this embodiment, km=kp.

In addition, as shown in Table 1, the speed reduction ratio of the rotation transmission system (first rotation transmission system) from the output shaft 41a of the engine 41 to the power output shaft 51 via the first power distributor 44 is switched by the speed change unit 49 between k1·(1+km)·k3 and k1·(1+km)·k4. Similarly, as shown in Table 1, the speed reduction ratio of the rotation transmission system (second rotation transmission system) from the output shaft 41a of the engine 41 to the power output shaft 51 via the second power distributor 45 is switched by the speed change unit 50 between k2·(1−kp)·k3 and k2·(1−kp)·k4. In order for these four speed reduction ratios to constitute a geometric progression, it is defined that k4=α²·k3. Here, as in the first embodiment, α is the ratio between the speed reduction ratio of the rotation transmission system (that is, the input-side first partial rotation transmission system) from the output shaft 41a of the engine 41 to the carrier 44c of the first power distributor 44 and the reduction ratio of the rotation transmission system (that is, the input-side second partial rotation transmission system) from the output shaft 41a of the engine 41 to the carrier 45c of the second power distributor 45. Since k1=k2 in this embodiment, α=(1+km)/(1−kp). Since the speed reduction ratios k3 and k4 of the speed change units 49 and 50 are set so that k4=α²·k3 (that is, k4/k3 is the second power (or a power) of α) as described above, the speed reduction ratios k1·(1+km)·k3, k1·(1+km)·k4, k2·(1−kp)·k3 and k2·(1−kp)·k4 arranged in ascending order of magnitude constitute a geometric progression with a multiplier of α, as in the first embodiment. In the following description, as in the first embodiment, the speed reduction ratios k1·(1+km)·k3, k1·(1+km)·k4, k2·(1−kp)·k 3 and k2·(1−kp)·k4 are referred to as a first speed reduction ratio R1 (=k1·(1+km)·k4), a second speed reduction ratio R2 (=k2·(1−kp)·k4), a third speed reduction ratio R3 (=k1·(1+km)·k3) and a fourth speed reduction ratio R4 (=k2·(1−kp)·k3) in descending order of magnitude.

The control of the hybrid vehicle having the power transmission device 43 according to this embodiment during speed-variable running is the same as in the first embodiment except for the control of the operation of the speed change units 49 and 50 and is achieved by the control unit (not shown). As with the control system according to the first embodiment shown in FIG. 2, the motors 46 and 47, which are electric motors, are controlled via motor driving circuits, and the clutches 48, 61 and 65 and the lock mechanisms 68 and 70 are controlled via actuators.

In this case, in speed-variable running of the vehicle, in the first speed variable range between the first speed reduction ratio R1 and the second speed reduction ratio R2 , the clutch 61 of the speed change unit 49 is controlled to connect the gear 60b of the higher-speed-reduction-ratio rotation transmission mechanism 59 to the member 62, and the clutch 65 of the speed change unit 50 is controlled to connect the gear 60c of the higher-speed-reduction-ratio rotation transmission mechanism 64 to the member 66. In this state, the part of the output torque of the engine 41 distributed to the first power distributor 44 is transmitted from the carrier 44c of the first power distributor 44 to the power output shaft 51 via the higher-speed-reduction-ratio rotation transmission mechanism 59 of the speed change unit 49, and the part of the output torque of the engine 41 distributed to the second power distributor 45 is transmitted from the carrier 45c of the second power distributor 45 to the power output shaft 51 via the higher-speed-reduction-ratio rotation transmission mechanism 64 of the speed change unit 50.

In the second speed variable range between the second speed reduction ratio and the third speed reduction ratio, the clutch 61 of the speed change unit 49 is controlled to connect the gear 53b of the lower-speed-reduction-ratio rotation transmission mechanism 58 to the member 62, and the clutch 65 of the speed change unit 50 is controlled to connect the gear 60c of the higher-speed-reduction-ratio rotation transmission mechanism 64 to the member 66. In this state, the part of the output torque of the engine 41 distributed to the first power distributor 44 is transmitted from the carrier 44c of the first power distributor 44 to the power output shaft 51 via the lower-speed-reduction-ratio rotation transmission mechanism 58 of the speed change unit 49, and the part of the output torque of the engine 41 distributed to the second power distributor 45 is transmitted to the power output shaft 51 along the same route as that for the first speed reduction range.

In the third speed variable range between the third speed reduction ratio and the fourth speed reduction ratio, the clutch 61 of the speed change unit 49 is controlled to connect the gear 53b of the lower-speed-reduction-ratio rotation transmission mechanism 58 to the member 62, and the clutch 65 of the speed change unit 50 is controlled to connect the gear 53c of the lower-speed-reduction-ratio rotation transmission mechanism 63 to the member 66. In this state, the part of the output torque of the engine 41 distributed to the first power distributor 44 is transmitted to the power output shaft 51 along the same route as that for the second speed variable range, and the part of the output torque of the engine 41 distributed to the second power distributor 45 is transmitted from the carrier 45c of the second power distributor 45 to the power output shaft 51 via the lower-speed-reduction-ratio rotation transmission mechanism 63 of the speed change unit 50. The other operations (that is, the control of the engine 41 and the motors 46, 47) are the same as in the first embodiment.

In the power transmission device 43 according to this embodiment, since the speed reduction ratio of the rotation transmission system (input-side first partial rotation transmission system) from the engine 41 to the carrier 44c of the first power distributor 44 is different from the speed reduction ratio of the rotation transmission system (input-side second partial rotation transmission system) from the engine 41 to the carrier 45c of the second power distributor 45, the vehicle can run at a variable speed in a plurality of speed variable ranges (first to third speed variable ranges) while sharing the components of the speed change units 49 and 50, as in the first embodiment. Thus, the vehicle can run while changing the speed widely with the small power transmission device 3. Thus, the vehicle can run while making the engine 41 operate at an operational point of the highest possible efficiency and assuring the running performance (required torque) of the vehicle. In addition, since the two speed reduction ratios of the speed change unit 49 may be the same as the two speed reduction ratios of the speed change unit 50, the speed change units 49 and 50 can have the same components. In addition, since a plurality of speed variable ranges can be provided, as in the first embodiment, the ratio between the maximum speed reduction ratio and the minimum speed reduction ratio from the engine 41 to the power output shaft 51 for each speed variable range can be kept small. Thus, the energy loss in the transmission of the power of the engine 41 to the power output shaft 51 can be reduced, so that the power of the engine 41 can be transmitted to the power output shaft 51 with a high efficiency, and thus, the energy efficiency of the vehicle can be improved.

Furthermore, since the speed reduction ratio k4 of the higher-speed-reduction-ratio rotation transmission mechanisms 59 and 64 and the speed reduction ratio k3 of the lower-speed-reduction-ratio rotation transmission mechanisms 58, 63 of the speed change units 49 and 50 are determined in such a manner that the ratio between the speed reduction ratios k3 and k4 (that is, k4/k3) is the second power (or a power) of the basic speed reduction ratio a, and the speed reduction ratios of rotation transmission from the engine 41 to the motors 46 and 47 are equal, the capacities of the motors 46 and 47 can be reduced to a minimum in each speed variable range, so that relatively small motors can be used as the motors 46 and 47, as in the first embodiment.

Furthermore, in this embodiment, as shown in FIG. 7, the shaft center C1 of the first power distributor 44 and first motor 46 and the shaft center C2 of the second power distributor 45 and second motor 47 are positioned symmetrically with respect to the shaft center C0 of the power input shaft 52 (which corresponds with the shaft center of the power output shaft 51). As a result, the first motor 46 and the second motor 47 can be disposed as close as possible while assuring that the shaft centers of the motors 46 and 47 are at an equal distance from the shaft center C0 of the power input shaft 52, so that the power transmission device 43 can be smaller in size.

In the embodiments described above, the speed reduction ratio of the rotation transmission system from the engine to the carrier of the power distributor is higher for the first power distributor than for the second power distributor. However, to the contrary, the speed reduction ratio for the second power distributor may be higher than that for the first power distributor. In such a case, for example, the second power distributor may be constituted by a planet gear unit of the single pinion type, and the first power distributor may be constituted by a planet gear unit of the double pinion type.

Furthermore, in the first embodiment, separate speed change units may be provided on the side of the carrier (first output shaft) of each power distributor, as in the second embodiment. To the contrary, in the second embodiment, only one speed change unit may be provided on the side of one of the power distributors, as in the first embodiment.

Furthermore, in the embodiments described above, the ratio between the speed reduction ratio of the higher-speed-reduction-ratio rotation transmission mechanisms and the speed reduction ratio of the lower-speed-reduction-ratio rotation transmission mechanisms of the speed change units is a power (the second power) of the basic speed reduction ratio $\alpha$ so that the speed reduction ratios at the ends of each speed variable range are equal, thereby achieving capacity reduction of the motors. However, if importance is placed on the energy transmission efficiency from the engine to the power output shaft in a normal running region of the vehicle (that is, running of the vehicle in a speed variable range for which the speed reduction ratio of rotation transmission from the engine to the power output shaft is closer to the lower speed reduction ratio), the ratio (>1) between the speed reduction ratios at the ends of the speed variable range closer to the lower speed reduction ratio can be lower than the ratio (1>) between the speed reduction ratios at the ends of the speed variable range closer to the higher speed reduction ratio. This can be achieved by setting a smaller basic speed reduction ratio a and setting the ratio between the speed reduction ratio of the lower-speed-reduction-ratio rotation transmission mechanisms and the speed reduction ratio of the higher-speed-reduction-ratio rotation transmission mechanisms of the speed change units larger than a power (the second power) of the basic speed reduction ratio $\alpha$. However, in such a case, the ratio between the speed reduction ratios at the ends of the speed variable range closer to the higher speed reduction ratio becomes larger. Therefore, of the output power of the engine, the energy passed to the motors increases, so that the transmission efficiency to the power output shaft decreases, and the required capacity of the motors increases.

What is claimed is:

1. A power transmission device for a hybrid vehicle, comprising:

a first power distributor and a second power distributor, each of the first and second power distributors which receives, at an input shaft, a rotational driving force from an engine;

a power output shaft for receiving the rotational driving force from a first output shaft of two output shafts of said first power distributor and a first output shaft of two output shafts of said second power distributor and outputting the received rotational driving force to driving wheels of the vehicle;

a first motor for supplying a driving torque or regenerative torque to a second output shaft of said first power distributor; and a second motor for supplying a driving torque or regenerative torque to a second output shaft of said second power distributor; and a first rotation transmission system from said engine to said power output shaft via said first power distributor and a second rotation transmission system from said engine to said power output shaft via said second power distributor wherein the first rotation transmission system from said engine to the first output shaft of the first power distributor via the input shaft thereof and the second rotation transmission system from said engine to the first output shaft of the second power distributor via the input shaft thereof are configured with different speed reduction ratio values, a first speed change unit for switching the speed reduction ratio from the first output shaft of the first power distributor to the power output shaft at a plurality of stages is provided with at least a the first rotation transmission system on the side of the first power distributor of the rotation transmission system from the first output shaft of the first power distributor to the power output shaft and the second rotation transmission system from the first output shaft of the second power distributor to the power output shaft, and the second rotation transmission system from the first output shaft of the second power distributor to the power output shaft achieves rotation transmission from the first output shaft of the second power distributor to the power output shaft via a rotational member of at least one of rotation transmission mechanisms for the stages of the first speed change unit, the rotational member being arranged concentrically with the power output shaft.

2. The power transmission device for a hybrid vehicle according to claim 1, wherein the second rotation transmission system from the first output shaft of the second power distributor to the power output shaft comprises second-power-distributor-side rotation transmission means for achieving rotation transmission from the first output shaft of the second power distributor to the power output shaft via a rotational member concentric with the power output shaft of a rotation transmission mechanism for a predetermined stage of the rotation transmission mechanisms for the stages of the first speed change unit at a speed reduction ratio equal to that of the rotation transmission mechanism for the predetermined stage.

3. The power transmission device for a hybrid vehicle according to claim 2, further comprising: clutch means for connecting and disconnecting the rotational member concentric with said power output shaft of the rotation transmission mechanism for the predetermined stage of the first speed change unit to and from said power output shaft; and clutch means for connecting and disconnecting a rotational member concentric with the first output shaft of said first power distributor of the first rotation transmission mechanism for the predetermined stage to and from the first output shaft.

4. The power transmission device for a hybrid vehicle according to claim 2 or 3, wherein the ratios between the speed reduction ratios of the rotation transmission mechanisms for the stages of said first speed change unit are values substantially equal to powers of α, where α is the ratio between the speed reduction ratio of the first rotation transmission system from said engine to the first output shaft of the first power distributor via the input shaft thereof and the speed reduction ratio of the second rotation transmission system from said engine to the first output shaft of the second power distributor via the input shaft thereof.

5. The power transmission device for a hybrid vehicle according to claim 1, wherein the second rotation transmission system from the first output shaft of said second power distributor to the power output shaft comprises a second speed change unit for switching the speed reduction ratio from the first output shaft of the second power distributor to the power output shaft at a plurality of stages, and at least one of the rotation transmission mechanisms for the stages of the second speed change unit is configured to achieve rotation transmission from the first output shaft of the second power distributor to the power output shaft via a rotational member of a rotation transmission mechanism concentric with the power output shaft for a predetermined stage of the rotation transmission mechanisms for the stages of the first speed change unit at a speed reduction ratio equal to that of the rotation transmission mechanism for the predetermined stage.

6. The power transmission device for a hybrid vehicle according to claim 5, wherein said first speed change unit and said second speed change unit have an equal number of stages of speed reduction ratio, the sets of values of the speed reduction ratios of the plurality of stages of the first speed change unit are the same as the sets of values of the speed reduction ratios of a plurality of the stages of the second speed change unit, and the rotation transmission mechanism for each stage of said first speed change unit and the rotation transmission mechanism of said second speed change unit for the stage of the same speed reduction ratio as the rotation transmission mechanism of the first speed change unit are arranged to achieve rotation transmission from the first output shaft of each power distributor to the power output shaft via the shared rotational member concentric with said power output shaft.

7. The power transmission device for a hybrid vehicle according to claim 5 or 6, wherein the ratios between the speed reduction ratios of the rotation transmission mechanisms for the stages of each of said first and second speed change units are values substantially equal to powers of α, where α is the ratio between the speed reduction ratio of the first rotation transmission system from said engine to the first output shaft of the first power distributor via the input shaft thereof and the speed reduction ratio of the second rotation transmission system from said engine to the first output shaft of the second power distributor via the input shaft thereof.

8. The power transmission device for a hybrid vehicle according to claim 1, wherein said first and second power distributors are each constituted by a planet gear unit comprising a ring gear, a carrier and a sun gear serving as the input shaft, the first output shaft and the second output shaft, respectively, the planet gear unit constituting any one of the power distributors comprises a plurality of pinion gears shaft-supported by the carrier each of which meshes with the ring gear and the sun gear, and the planet gear unit constituting the other of the power distributors comprises a plurality of pairs of pinion gears shaft-supported by the carrier, the pinion gears in each pair meshing with each other and with the ring gear and the sun gear.

9. The power transmission device for a hybrid vehicle according to claim 1, wherein the first rotation transmission system from said engine to the first motor via the input shaft and second output shaft of the first power distributor and the second rotation transmission system from said engine to the second motor via the input shaft and second output shaft of the second power distributor are configured to have substantially the same speed reduction ratio.

10. The power transmission device for a hybrid vehicle according to claim 1, wherein the rotation shaft of the first motor is arranged concentrically with the second output shaft of the first power distributor, the rotation shaft of the second motor is arranged concentrically with the second output shaft of the second power distributor, the power transmission device comprises a power input shaft for distributing the rotational driving force from said engine to the input shafts of the power distributors, and the first and second motors are positioned in such a manner that the shaft centers of the rotation shafts thereof are symmetric with respect to the shaft center of the power input shaft.

* * * * *